(12) United States Patent
Greene et al.

(10) Patent No.: US 10,248,143 B2
(45) Date of Patent: Apr. 2, 2019

(54) ARCHITECTURE FOR THERMOSTAT CONTROL DURING TIME-OF-USE INTERVALS

(71) Applicant: Google LLC, Mountain View, CA (US)

(72) Inventors: William Greene, San Bruno, CA (US); Scott McGaraghan, Los Altos, CA (US); Jonathan Crimins, Los Altos, CA (US); Scott Ruffner, San Francisco, CA (US); Allen Minich, Mountain View, CA (US); Todd Hester, London (GB); Amanda Sahl, Palo Alto, CA (US); Praveen Subramani, San Francisco, CA (US)

(73) Assignee: Google LLC, Mountain View, CA (US)

( * ) Notice: Subject to any disclaimer, the term of this patent is extended or adjusted under 35 U.S.C. 154(b) by 204 days.

(21) Appl. No.: 15/187,562

(22) Filed: Jun. 20, 2016

(65) Prior Publication Data
US 2017/0364105 A1    Dec. 21, 2017

(51) Int. Cl.
| | | |
|---|---|---|
| F24F 11/30 | (2018.01) | |
| G05D 23/19 | (2006.01) | |
| F24F 11/62 | (2018.01) | |
| F24F 110/10 | (2018.01) | |
| F24F 140/60 | (2018.01) | |

(Continued)

(52) U.S. Cl.
CPC .......... *G05D 23/1917* (2013.01); *F24F 11/30* (2018.01); *F24F 11/62* (2018.01); *F24F 11/46* (2018.01); *F24F 11/47* (2018.01); *F24F 11/61* (2018.01); *F24F 11/64* (2018.01); *F24F 11/65* (2018.01); *F24F 2110/10* (2018.01); *F24F 2140/60* (2018.01)

(58) Field of Classification Search
CPC .. F24F 11/30; F24F 11/46; F24F 11/47; F24F 11/61; F24F 11/62; F24F 11/64; F24F 11/65; F24F 2110/10; F24F 2140/60; G05D 23/1917
See application file for complete search history.

(56) References Cited

U.S. PATENT DOCUMENTS

| | | | | |
|---|---|---|---|---|
| 8,204,628 B2 * | 6/2012 | Schnell | ................. | G06Q 50/06 700/278 |
| 8,538,586 B2 * | 9/2013 | Amundson | ........ | G05D 23/1923 700/276 |

(Continued)

*Primary Examiner* — Abdelmoniem I Elamin
(74) *Attorney, Agent, or Firm* — Kilpatrick Townsend & Stockton LLP

(57) ABSTRACT

A thermostat my include a stored setpoint schedule, temperature sensors providing temperature sensor measurements; and a processing system configured to control an HVAC system based at least in part on the setpoint temperature and the temperature sensor measurements. The processing system may be configured to control the HVAC system by receiving an indication of a first time interval, where energy is available to the HVAC system at a first rate during the first time interval, energy is available to the HVAC system at a second rate during a second time interval that is outside of the first time interval, and the first rate is higher than the second rate; identifying a first one or more setpoints in the plurality of setpoints of the stored setpoint schedule that occur in the first time interval; and decreasing a temperature component of at least one of the first one or more setpoints.

20 Claims, 27 Drawing Sheets

(51) Int. Cl.
*F24F 11/64* (2018.01)
*F24F 11/65* (2018.01)
*F24F 11/61* (2018.01)
*F24F 11/46* (2018.01)
*F24F 11/47* (2018.01)

(56) References Cited

U.S. PATENT DOCUMENTS

| | | | | |
|---|---|---|---|---|
| 2009/0018673 | A1* | 1/2009 | Dushane | G05B 19/042 700/9 |
| 2011/0184564 | A1* | 7/2011 | Amundson | G05D 23/1923 700/278 |
| 2011/0238224 | A1* | 9/2011 | Schnell | G06Q 50/06 700/278 |
| 2012/0029725 | A1* | 2/2012 | Lafleur | G05D 23/1924 700/300 |
| 2012/0053739 | A1* | 3/2012 | Brian | G06F 1/3203 700/287 |
| 2013/0099011 | A1* | 4/2013 | Matsuoka | G05D 23/1904 236/1 C |
| 2014/0203092 | A1* | 7/2014 | Broniak | F24D 19/1087 237/12 |
| 2016/0131382 | A1* | 5/2016 | Rosen | F24F 11/006 700/278 |
| 2017/0363312 | A1* | 12/2017 | Crimins | G05B 19/042 |

* cited by examiner

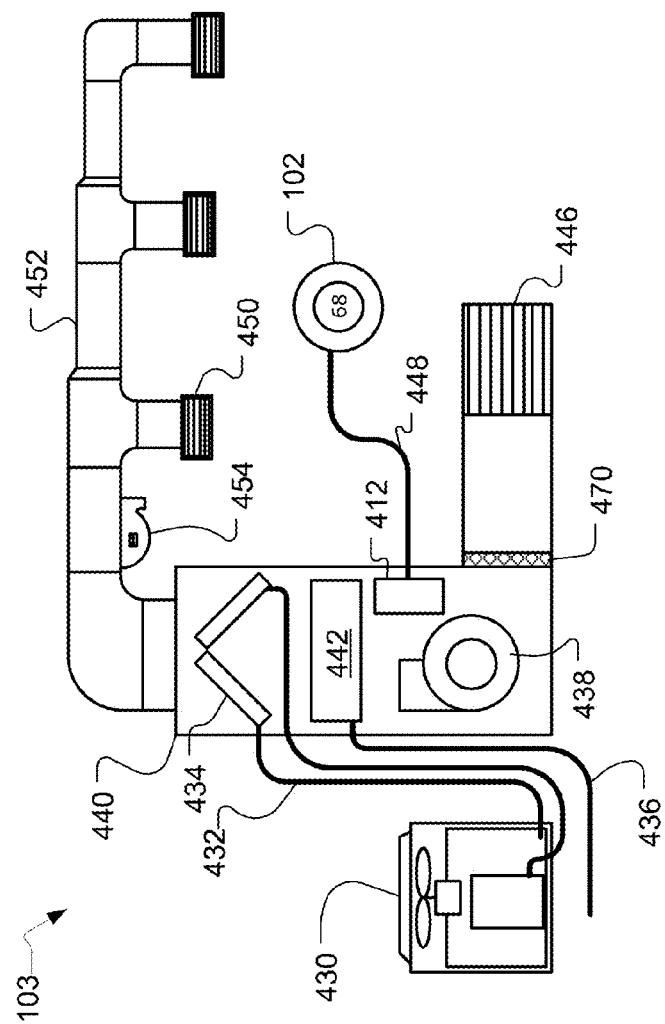

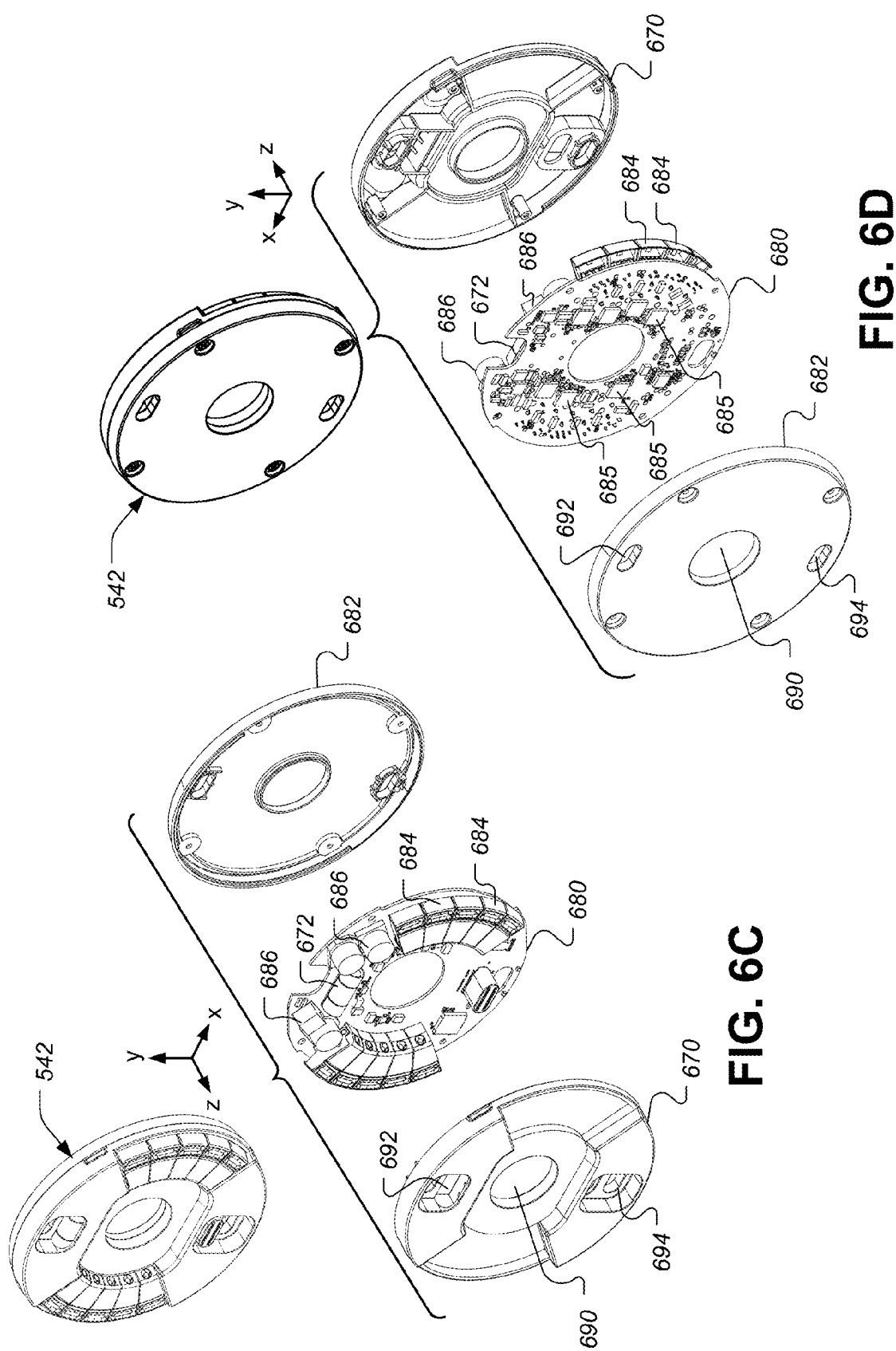

1202

| Enroll Structure in Program by Device |
|---|
| POST /api/partner/v1/programs/<program-instanceid>/structures/enroll_by_device |
| Inputs: device_serial_number, terms_of_service_acceptance_time |
| Outputs: structure-id |
| Errors: STRUCTURE_NOT_FOUND, STRUCTURE_NOT_ENROLLED |

1204

| Unenroll Structure in Program |
|---|
| DELETE /api/partner/v1/programs/<program-instance-id>/structures/<structureid> |
| Errors: STRUCTURE_NOT_FOUND, STRUCTURE_NOT_ENROLLED |

1206

| Assign Rate Plan to Structure |
|---|
| PUT /api/energy/v1/structures/<structure-id>/rate_plan |
| Inputs: rate_plan_id, activation_time |
| Errors: STRUCTURE_NOT_FOUND, RATE_PLAN_NOT_FOUND, INVALID_ACTIVATION_TIME |

| Get Rate Plan for a Structure |
|---|
| GET /api/energy/v1/structures/<structure-id>/rate_plan |
| Inputs: time |
| Outputs: rate_plan_id |
| Errors: STRUCTURE_NOT_FOUND |

1210

| Set HVAC Capacities for a Device |
|---|
| PUT /api/energy/v1/structures/<structure-id>/devices/<deviceid>/hvac_capacities |
| Inputs: structure_id, device_serial_number, cooling_capacity(...), primary_heating_capacity(...), secondary_heating_capacity(...), fan_efficiency |
| Errors: STRUCTURE_NOT_FOUND |

| Create Rate Plan |
| --- |
| POST /api/energy/v1/rate_plans |
| Inputs: name, description, intervals[start_time, end_time, costs[threshold, price]] |
| Outputs: rate_plan_id |
| Errors: INVALID_INTERVALS, NAME_ALREAD_USED |

1304

| Get Rate Plan |
| --- |
| GET /api/energy/v1/rate_plans/<rate-plan-id> |
| Outputs: rate_plan_id, name, description, end_time_of_intervals |
| Errors: RATE_PLAN_NOT_FOUND |

1306

| Update Rate Plan |
| --- |
| PUT /api/energy/v1/rate_plans/<rate-plan-id> |
| Outputs: description |
| Errors: RATE_PLAN_NOT_FOUND |

1308

| Delete Rate Plan |
| --- |
| DELETE /api/energy/v1/rate_plans/<rate-plan-id> |
| Errors: RATE_PLAN_NOT_FOUND, RATE_PLAN_IN_USE |

| List Rate Plans |
|---|
| GET /api/energy/v1/rate_plans |
| Outputs: rate_plan_id, name, description, end_time_of_intervals |

1312

| Add Intervals |
|---|
| POST /api/energy/v1/rate_plans/<rate-plan-id>/intervals |
| Inputs: intervals[start_time, end_time, costs[threshold, price]] |
| Errors: INVALID_INTERVALS, RATE_PLAN_NOT_FOUND |

1314

| Clear Intervals |
|---|
| DELETE /api/energy/v1/rate_plans/<rate-plan-id>/intervals |
| Inputs: after_time |
| Errors: INVALID_AFTER_TIME, RATE_PLAN_NOT_FOUND |

1316

| Get Intervals |
|---|
| GET /api/energy/v1/rate_plans/<rate-plan-id>/intervals |
| Inputs: start_time, end_time, limit |
| Outputs: intervals[start_time, end_time, costs[threshold, price]] |
| Errors: RATE_PLAN_NOT_FOUND |

FIG. 13B

Time of Use Bucket — 1502

```
"version":"1.0",
"debug_name":"Test ToU Event",
"id":"7169bbffa6df420999bae8da49e1be54",
"rate_plan":"rate_plan.6169bbffa6df420999bae8da49e1be54",
"currency_code":"USD",
"state":"PEAK_CONTROL",
"stop_reason":"NONE",
"gear_lower_threshold":10.00,
"gear_upper_threshold":25.00,
"next_off_peak_epoch":1447475621,
"next_on_peak_epoch":1447471221,
"fuel_type":"ELECTRIC",
"current_rateplan_interval":{
    "start_epoch":1447205651,
    "end_epoch":1447405621,
    "tier_level":0,
    "average_price_per_kwh":0.234,
    "cost_multiplier":1.00
},
"optimization_parameters":{
    "enable_schedule_optimizations":true,
    "enable_control_optimizations":true,
    "enable_dynamic_preconditioning":true,
    "total_schedule_adjustment":0.667,
    "schedule_adjustment_days":7
}
}
```

Rate Plan Bucket — 1504

```
"version":"1.0",
"debug_name":"Test Rate Plan",
"id":"7169bbffa6df420999bae8da49e1be54",
"currency_code":"USD",
"utility_name":"PG&E",
"next_pricing_plan":{
    "start_epoch":1449273600,
},
"intervals":[
    {
        "start_epoch":1447205651,
        "end_epoch":1447405621,
        "average_price_per_kwh":0.234,
        "cost_multiplier":1.00
    },
    {
        "start_epoch":1447405621,
        "end_epoch":1447705228,
        "average_price_per_kwh":0.481,
        "cost_multiplier":2.301
    },
    {
        "start_epoch":1447705228,
        "end_epoch":1448005621,
        "average_price_per_kwh":1.634,
        "cost_multiplier":5.301
    }
]
}
```

FIG. 15

ARCHITECTURE FOR THERMOSTAT CONTROL DURING TIME-OF-USE INTERVALS

BACKGROUND

Energy providers face variable rates for energy during different yearly seasons and even throughout the hours of a single day. Energy rates for utility providers are often low in the morning and late at night, and then climb during peak-power usage hours in the late afternoon as customers run their air conditioners more extensively. However, many rate plans offered by energy providers to customers use a standard energy rate that does not track with the varying rate of energy paid by the energy providers. In order to more accurately pass the costs of energy onto customers, energy providers are beginning to offer residential time-of-use rates more widely. These pricing plans mean that customers are offered different rates for energy at different times of the day.

The problem is that customers have no easy or automated way of changing their consumption pattern to adapt to pricing changes through the course of a day, or from season to season, as these plans change). Utilities want to encourage more of their customers to adopt time-of-use rate plans because it more closely associates the cost to generate electricity with the rate the customer is paying. Key challenges of enabling adoption of these plans include helping customers (1) understand the implication of adopting a time-of-use rate plan, (2) adjust their consumption pattern to align with the customer's specific plan, and (3) manage energy usage within that persistent pricing plan, while automatically adapting to any short and long-term changes.

BRIEF SUMMARY

In some embodiments, a thermostat may include a housing; one or more memory devices comprising a stored setpoint schedule, where the stored setpoint schedule comprises a plurality of setpoints; one or more temperature sensors, each of the one or more temperature sensors being configured to provide temperature sensor measurements; and a processing system disposed within the housing. The processing system may be configured to be in operative communication with the one or more temperature sensors to receive the temperature sensor measurements, in operative communication with the one or more memory devices to determine a setpoint temperature, and in still further operative communication with a heating, ventilation, and air conditioning (HVAC) system to control the HVAC system based at least in part on the setpoint temperature and the temperature sensor measurements. The processing system may be programmed or configured to control the HVAC system by performing operations including receiving an indication of a first time interval, where energy may be available to the HVAC system at a first rate during the first time interval, energy may be available to the HVAC system at a second rate during a second time interval that is outside of the first time interval, and the first rate may be higher than the second rate. The operations may also include identifying a first one or more setpoints in the plurality of setpoints of the stored setpoint schedule that occur in the first time interval, and decreasing a temperature component of at least one of the first one or more setpoints.

In some embodiments, a method of operating a thermostat may include storing a stored setpoint schedule in one or more memory devices, wherein the stored setpoint schedule comprises a plurality of setpoints; receiving temperature sensor measurements from one or more temperature sensors; and controlling an air conditioning (HVAC) system based at least in part on the stored setpoint schedule and the temperature sensor measurements. The method may also include receiving an indication of a first time interval, where energy may be available to the HVAC system at a first rate during the first time interval, energy may be available to the HVAC system at a second rate during a second time interval that may be outside of the first time interval, and the first rate may be higher than the second rate. The method may also include identifying a first one or more setpoints in the plurality of setpoints of the stored setpoint schedule that occur in the first time interval; and decreasing a temperature component of at least one of the first one or more setpoints.

In any of the embodiments described herein, any of the following features may be included in any combination and without limitation. The method/operations may also include identifying a first setpoint in the plurality of setpoints of the stored setpoint schedule that occurs within a threshold time before a beginning of the first time interval, and moving the first setpoint to the beginning of the first time interval in the stored setpoint schedule. The method/operations may also include identifying a first setpoint in the plurality of setpoints of the stored setpoint schedule that occurs within a threshold time before an end of the first time interval; and moving the first setpoint to the end of the first time interval in the stored setpoint schedule. The method/operations may also include identifying a first setpoint in the plurality of setpoints of the stored setpoint schedule that occurs within a threshold time after a beginning of the first time interval, and removing the first setpoint from the stored setpoint schedule. The method/operations may additionally include identifying a first setpoint in the plurality of setpoints of the stored setpoint schedule that occurs within a threshold time after an end of the first time interval, and removing the first setpoint from the stored setpoint schedule. The method/operations may further include inserting a first setpoint at a beginning of the first time interval into the plurality of setpoints of the stored setpoint schedule. The method/operations may further include inserting a first setpoint at an end of the first time interval into the plurality of setpoints of the stored setpoint schedule. The first time interval may be regularly repeated on a daily basis. The method/operations may also include generating a version of the stored setpoint schedule that removes any changes that were automatically made in response to receiving the indication of the first time interval during a previous day; and generating a schedule without interval adjustments by executing an algorithm that learns user behavior by analyzing setpoint adjustments to the stored setpoint temperature schedule made by a user, where the algorithm may be executed using the version of the stored setpoint schedule that removes any changes that were automatically made in response to receiving the indication of the first time interval during the previous day. The method/operations may also include generating a schedule with interval adjustments by appending any adjustments to the stored setpoint temperature schedule made by a user during the previous day to the stored setpoint schedule, and combining the schedule without interval adjustments to the schedule with interval adjustments to generate a learned setpoint schedule with interval adjustments. The method/operations may further include replacing the stored setpoint schedule with learned setpoint schedule with interval adjustments for a next day following the previous day. The indication of the first time interval may be received from a thermostat management server. The first time interval may be defined by a start time, an end time, an average price per kilowatt hour, and a cost multiplier during the first time interval. The first time interval may be received as part of a plurality of time intervals, and the plurality of time intervals may be continuous. The plurality of time intervals may be defined by a utility provider, and may be transmitted to a thermostat management server via a custom application programming interface (API). The utility provider may include a solar panel provider, where the utility provider may have installed one or more solar panels at a structure in which the thermostat is installed. The method/operations may also include receiving, from the thermostat management server, an HVAC capacity, where the HVAC capacity may be measured by the solar panel provider when the solar panels are installed at the structure.

BRIEF DESCRIPTION OF THE DRAWINGS

FIG. 4 illustrates a schematic diagram of an HVAC system, according to some embodiments.

FIGS. 6C-6D illustrate exploded front and rear perspective views, respectively, of a back plate unit with respect to its primary components, according to some embodiments.

FIGS. 12A-12B illustrate interface definitions for the API provided to the utility provider by the thermostat management server that can be used to enroll structures and defined ToU rate plans, according to some embodiments.

FIGS. 13A-13B illustrate interface definitions for the API provided to the utility provider by the thermostat management server that can be used to define, maintain, and/or update definitions of the rate plans assigned to various structures, according to some embodiments.

FIG. 15 illustrates a JSON representation of data stored in two of the significant synchronization buckets 1404.

DETAILED DESCRIPTION OF THE INVENTION

Figure 1:
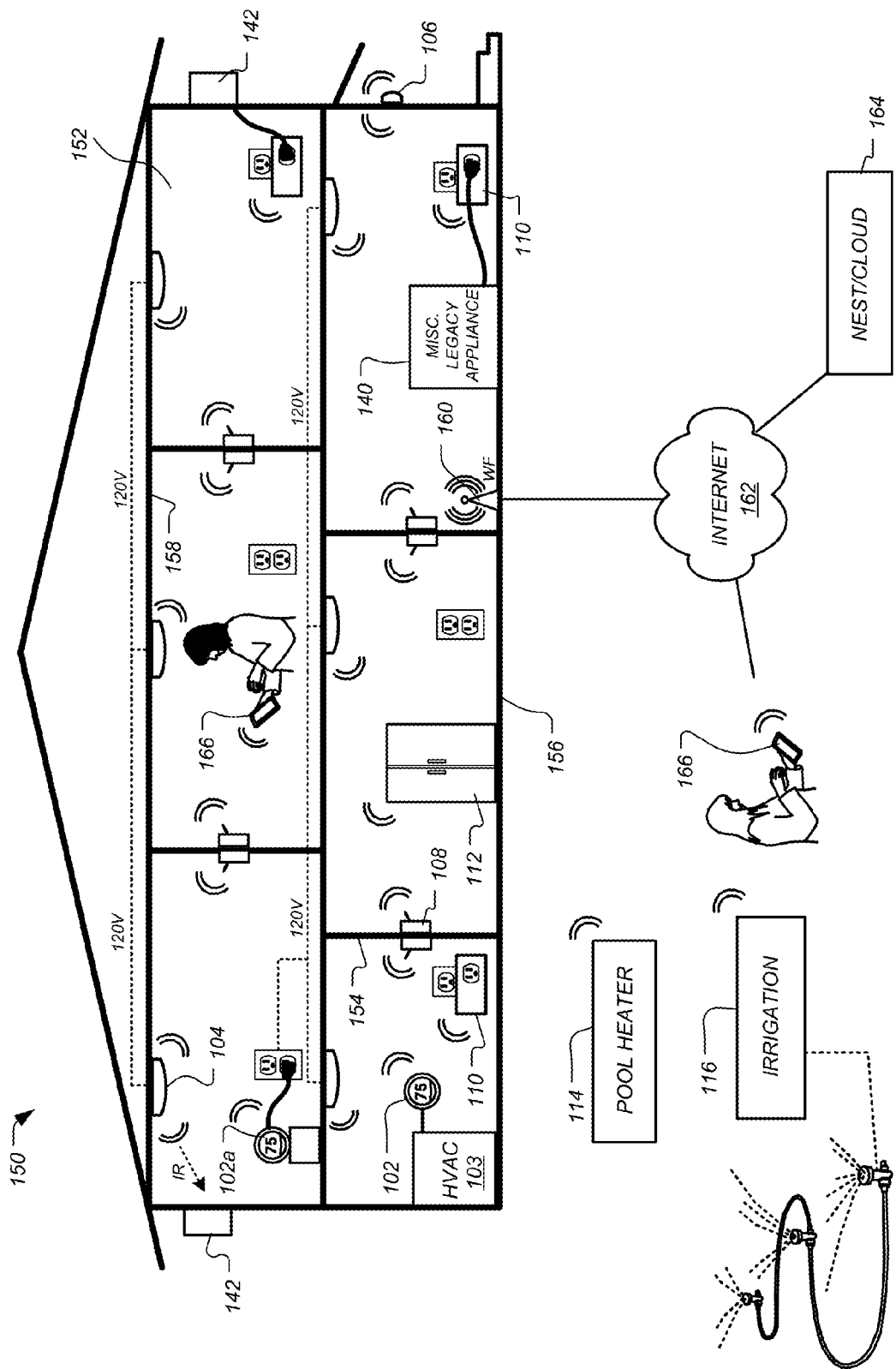
FIG. 1 illustrates an example of a smart home environment within which one or more of the devices, methods, systems, services, and/or computer program products described further herein can be applicable.

The subject matter of this patent specification relates to the subject matter of the following commonly assigned application, filed on the same day as the present application, which is incorporated by reference herein:

U.S. patent application Ser. No. 15/187,562, filed on Jun. 20, 2016, entitled "Architecture for Thermostat Control during Peak Intervals," by Crimins et al.

The Smart-Home Environment

A detailed description of the inventive body of work is provided herein. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to thermostats that are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 illustrates an example of a smart home environment within which one or more of the devices, methods, systems, services, and/or computer program products described further herein can be applicable. The depicted smart home environment includes a structure 150, which can include, e.g., a house, office building, garage, or mobile home. It will be appreciated that devices can also be integrated into a smart home environment that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor or ceiling.

The smart home depicted in FIG. 1 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described herein. Examples of devices are shown in FIG. 1.

An intelligent, multi-sensing, network-connected thermostat 102 can detect ambient climate characteristics (e.g., temperature and/or humidity) and control a heating, ventilation and air-conditioning (HVAC) system 103. One or more intelligent, network-connected, multi-sensing hazard detection units 104 can detect the presence of a hazardous substance and/or a hazardous condition in the home environment (e.g., smoke, fire, or carbon monoxide). One or more intelligent, multi-sensing, network-connected entryway interface devices 106, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 108 can detect ambient lighting conditions, detect room-occupancy states and control a power and/or dim state of one or more lights. In some instances, light switches 108 can further or alternatively control a power state or speed of a fan, such as a ceiling fan. Each of a plurality of intelligent, multi-sensing, network-connected wall plug interfaces 110 can detect occupancy of a room or enclosure and control supply of power to one or more wall plugs (e.g., such that power is not supplied to the plug if nobody is at home). The smart home may further include a plurality of intelligent, multi-sensing, network-connected appliances 112, such as refrigerators, stoves and/or ovens, televisions, washers, dryers, lights (inside and/or outside the structure 150), stereos, intercom systems, garage-door openers, floor fans, ceiling fans, whole-house fans, wall air conditioners, pool heaters 114, irrigation systems 116, security systems (including security system components such as cameras, motion detectors and window/door sensors), and so forth. While descriptions of FIG. 1 can identify specific sensors and functionalities associated with specific devices, it will be appreciated that any of a variety of sensors and functionalities (such as those described throughout the specification) can be integrated into the device.

In addition to containing processing and sensing capabilities, each of the devices 102, 104, 106, 108, 110, 112, 114 and 116 can be capable of data communications and information sharing with any other of the devices 102, 104, 106, 108, 110, 112, 114 and 116, as well as to any cloud server or any other device that is network-connected anywhere in the world. The devices can send and receive communications via any of a variety of custom or standard wireless protocols (Wi-Fi, ZigBee, 6LoWPAN, Thread, Bluetooth, BLE, HomeKit Accessory Protocol (HAP), Weave, etc.) and/or any of a variety of custom or standard wired protocols (CAT6 Ethernet, HomePlug, etc.). The wall plug interfaces 110 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 160. A device can further communicate with remote devices via a connection to a network, such as the Internet 162. Through the Internet 162, the device can communicate with a central server or a cloud-computing system 164. The central server or cloud-computing system 164 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 140, such as old conventional washer/dryers, refrigerators, and the like which can be controlled, albeit coarsely (ON/OFF), by virtue of the wall plug interfaces 110. The smart home can further include a variety of partially communicating legacy appliances 142, such as IR-controlled wall air conditioners or other IR-controlled devices, which can be controlled by IR signals provided by the hazard detection units 104 or the light switches 108.

Figure 2:
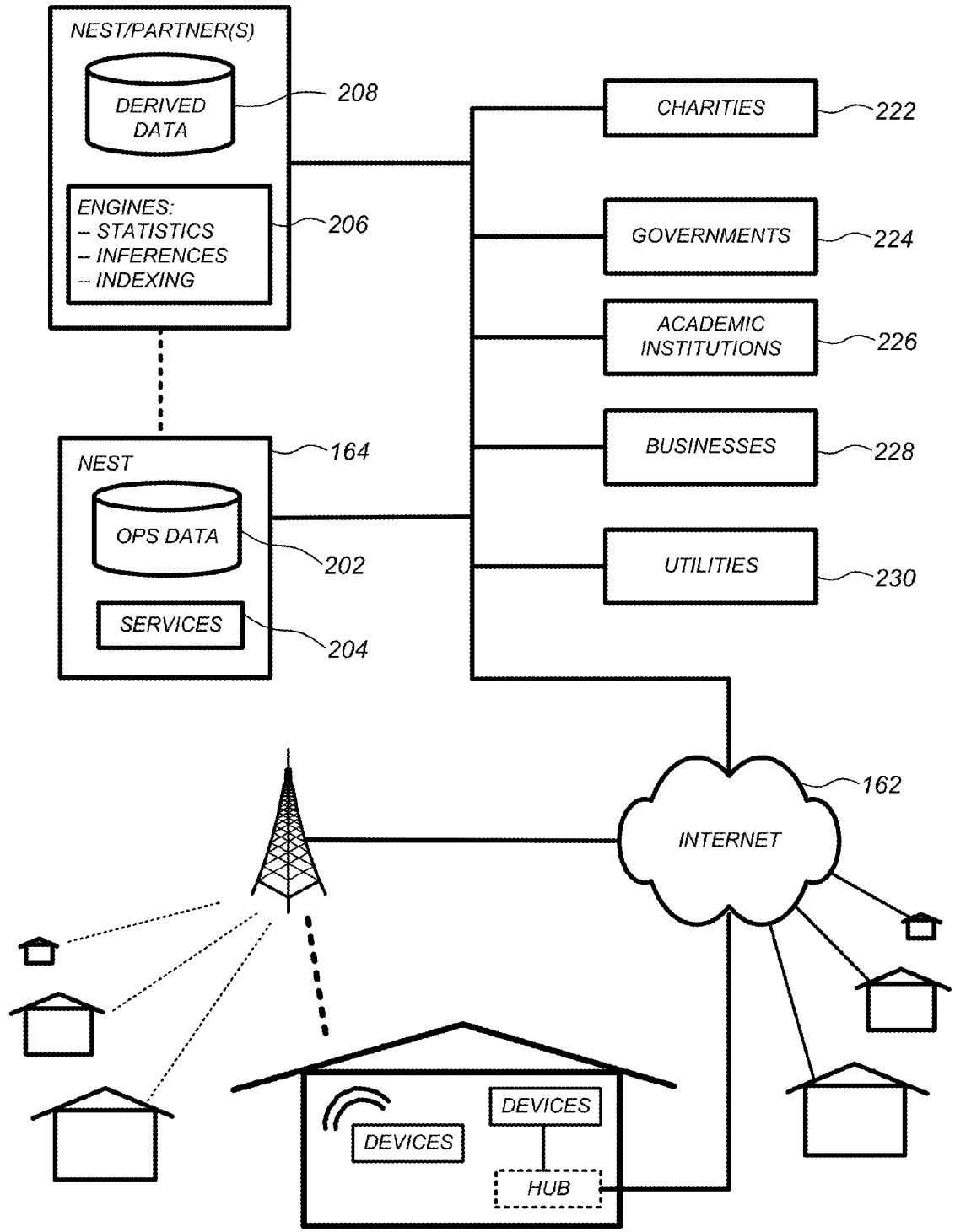
FIG. 2 illustrates a network-level view of an extensible devices and services platform with which the smart home of FIG. 1 can be integrated, according to some embodiments.

FIG. 2 illustrates a network-level view of an extensible devices and services platform with which the smart home of FIG. 1 can be integrated, according to some embodiments. Each of the intelligent, network-connected devices from FIG. 1 can communicate with one or more remote central servers or cloud computing systems 164. The communication can be enabled by establishing connection to the Internet 162 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 164 can collect operation data 202 from the smart home devices. For example, the devices can routinely transmit operation data or can transmit operation data in specific instances (e.g., when requesting customer support). The central server or cloud-computing architecture 164 can further provide one or more services 204. The services 204 can include, e.g., software update, customer support, sensor data collection/logging, remote access, remote or distributed control, or use suggestions (e.g., based on collected operation data 204 to improve performance, reduce utility cost, etc.). Data associated with the services 204 can be stored at the central server or cloud-computing system 164 and the central server or cloud-computing system 164 can retrieve and transmit the data at an appropriate time (e.g., at regular intervals, upon receiving request from a user, etc.).

One salient feature of the described extensible devices and services platform, as illustrated in FIG. 2, is a processing engines 206, which can be concentrated at a single server or distributed among several different computing entities without limitation. Processing engines 206 can include engines configured to receive data from a set of devices (e.g., via the Internet or a hubbed network), to index the data, to analyze the data and/or to generate statistics based on the analysis or as part of the analysis. The analyzed data can be stored as derived data 208. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 162. In this manner, processing engines 206 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engines 206 can generate statistics about device usage across a population of devices and send the statistics to device users, service providers or other entities (e.g., that have requested or may have provided monetary compensation for the statistics). As specific illustrations, statistics can be transmitted to charities 222, governmental entities 224 (e.g., the Food and Drug Administration or the Environmental Protection Agency), academic institutions 226 (e.g., university researchers), businesses 228 (e.g., providing device warranties or service to related equipment), or utility companies 230. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 3:
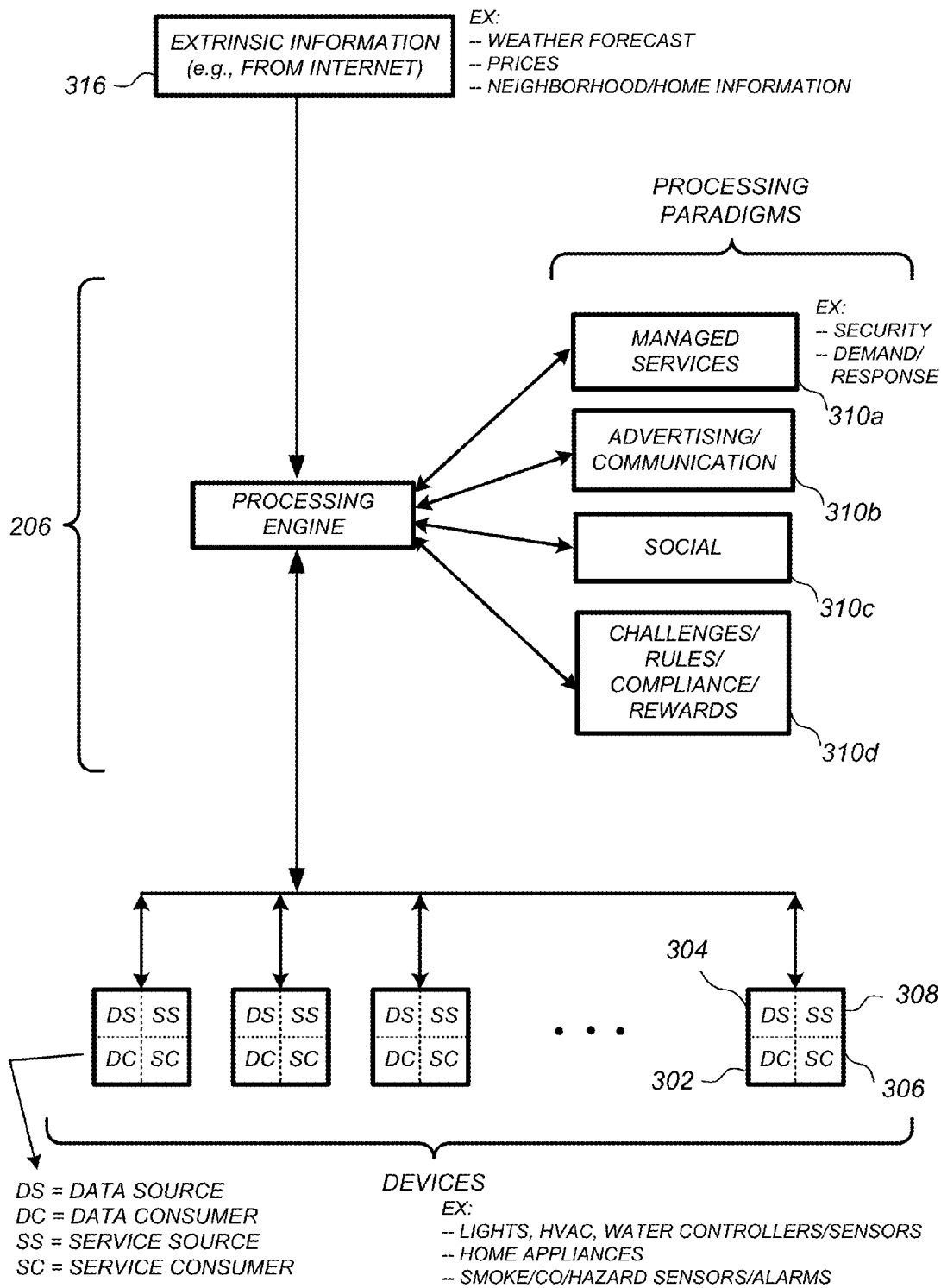
FIG. 3 illustrates an abstracted functional view of the extensible devices and services platform of FIG. 2, according to some embodiments.

FIG. 3 illustrates an abstracted functional view of the extensible devices and services platform of FIG. 2, with particular reference to the processing engine 206 as well as the devices of the smart home. Even though the devices situated in the smart home will have an endless variety of different individual capabilities and limitations, they can all be thought of as sharing common characteristics in that each of them is a data consumer 302 (DC), a data source 304 (DS), a services consumer 306 (SC), and a services source 308 (SS).

Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 206 can include a challenges/rules/compliance/rewards paradigm 310d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine can integrate or otherwise utilize extrinsic information 316 from extrinsic sources to improve the functioning of one or more processing paradigms. Extrinsic information 316 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

FIG. 4 is a schematic diagram of an HVAC system, according to some embodiments. HVAC system 103 provides heating, cooling, ventilation, and/or air handling for an enclosure, such as structure 150 depicted in FIG. 1. System 103 depicts a forced air type heating and cooling system, although according to other embodiments, other types of HVAC systems could be used such as radiant heat based systems, heat-pump based systems, and others.

For carrying out the heating function, heating coils or elements 442 within air handler 440 provide a source of heat using electricity or gas via line 436. Cool air is drawn from the enclosure via return air duct 446 through filter 470, using fan 438 and is heated through heating coils or elements 442. The heated air flows back into the enclosure at one or more locations via supply air duct system 452 and supply air registers such as register 450. In cooling, an outside compressor 430 passes a refrigerant gas through a set of heat exchanger coils and then through an expansion valve. The gas then goes through line 432 to the cooling coils or evaporator coils 434 in the air handler 440 where it expands, cools and cools the air being circulated via fan 438. A humidifier 454 may optionally be included in various embodiments that returns moisture to the air before it passes through duct system 452. Although not shown in FIG. 4, alternate embodiments of HVAC system 103 may have other functionality such as venting air to and from the outside, one or more dampers to control airflow within the duct system 452 and an emergency heating unit. Overall operation of HVAC system 103 is selectively actuated by control electronics 412 communicating with thermostat 102 over control wires 448.

The Smart-Home Thermostat

Figure 5A:
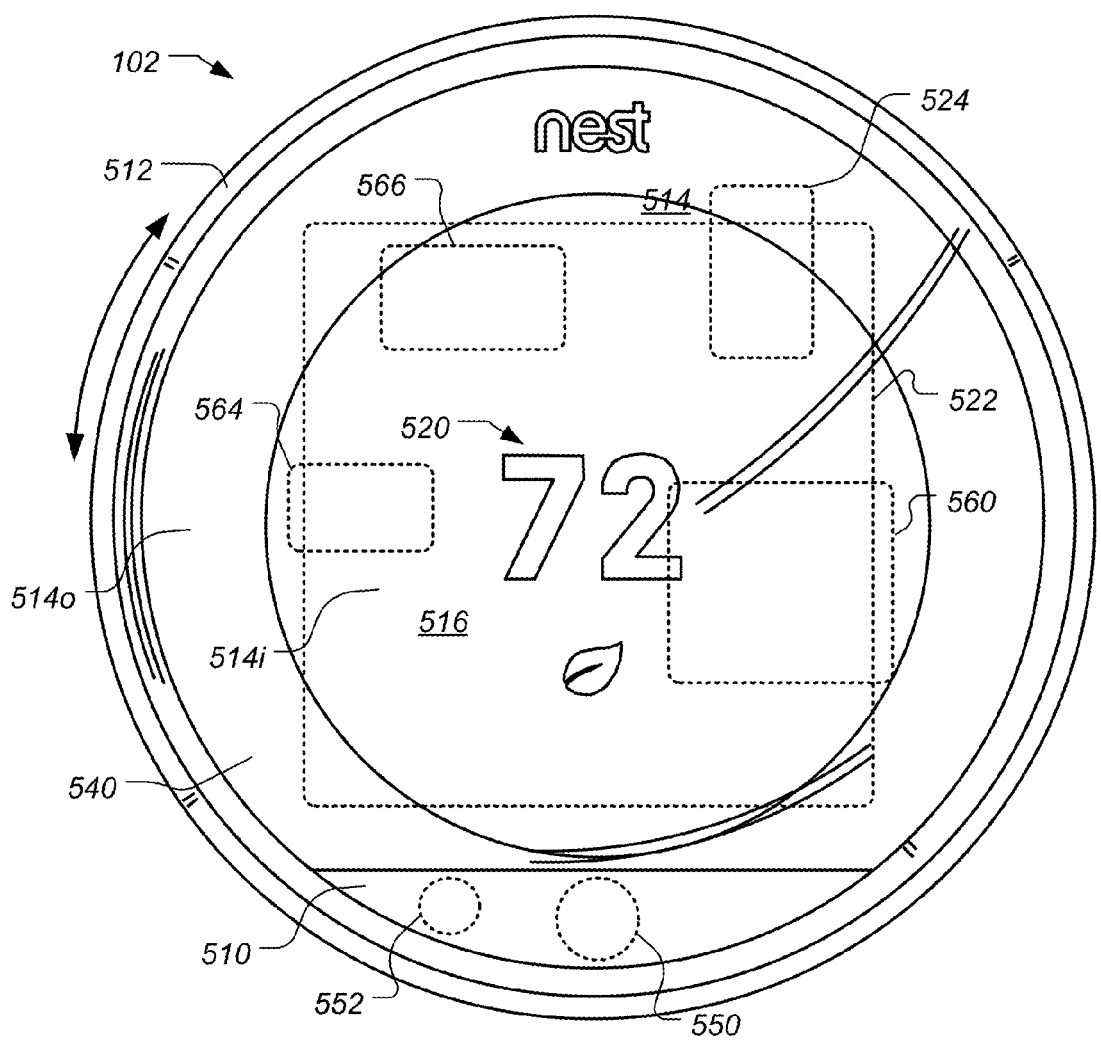
FIG. 5A-5B illustrate a thermostat having a visually pleasing, smooth, sleek and rounded exterior appearance while at the same time including one or more sensors for detecting occupancy and/or users, according to some embodiments.
Figure 5B:
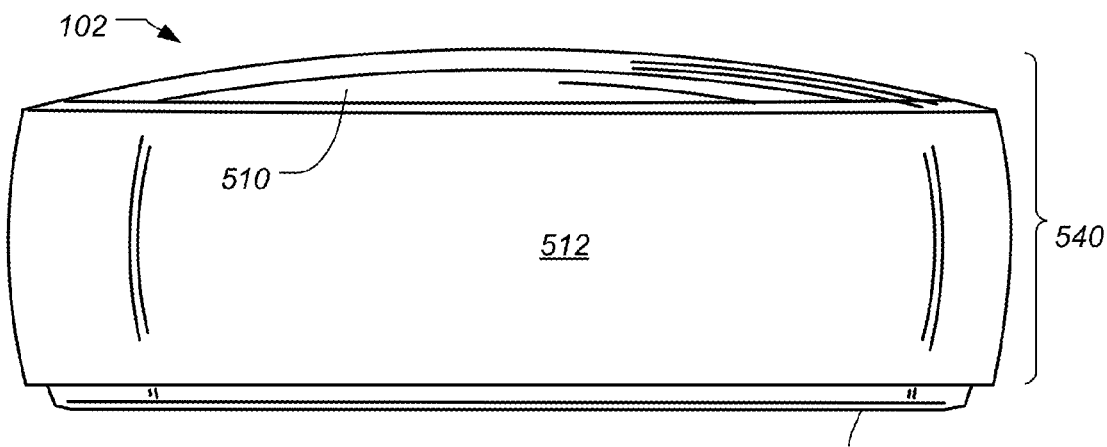

FIGS. 5A-5B illustrate a thermostat having a rounded exterior appearance and including one or more sensors for detecting environmental conditions, such as occupancy and/or users, temperature, ambient light, humidity, and so forth. FIG. 5A is front view, and FIG. 5B is a bottom elevation view of thermostat 102. Unlike many prior art thermostats, thermostat 102 has a simple and elegant design. Moreover, user interaction with thermostat 102 is facilitated and greatly enhanced over known conventional thermostats. The thermostat 102 includes control circuitry and is electrically connected to an HVAC system 103, such as is shown in FIGS. 1-4. Thermostat 102 is wall mountable, is circular in shape, and has an outer rotatable ring 512 for receiving user input. Thermostat 102 has a large convex rounded front face lying inside the outer rotatable ring 512. According to some embodiments, thermostat 102 is approximately 84 mm in diameter and protrudes from the wall, when wall mounted, by 30 mm. The outer rotatable ring 512 allows the user to make adjustments, such as selecting a new setpoint temperature. For example, by rotating the outer ring 512 clockwise, the real-time (i.e. currently active) setpoint temperature can be increased, and by rotating the outer ring 512 counter-clockwise, the real-time setpoint temperature can be decreased.

The front face of the thermostat 102 comprises a cover 514 that according to some embodiments is polycarbonate, and a lens 510 having an outer shape that matches the contours of the curved outer front face of the thermostat 102. According to some embodiments, Fresnel lens elements may are formed on the interior surface of the lens 510 such that they are not obviously visible by viewing the exterior of the thermostat 102. Behind the lens 510 is a passive infrared (PIR) sensor 550 for detecting occupancy, a temperature sensor that is thermally coupled to the lens 510, and a multi-channel thermopile for detecting occupancy, user approaches, and motion signatures. The Fresnel lens elements of the lens 510 are made from a high-density polyethylene (HDPE) that has an infrared transmission range appropriate for sensitivity to human bodies. The lens 510 may also include thin sections that allow a near-field proximity sensor 552, such as a multi-channel thermopile, and a temperature sensor to "see-through" the lens 510 with minimal interference from the polyethylene. As shown in FIGS. 5A-5B, the front edge of the outer rotatable ring 512, cover 514, and lens 510 are shaped such that they together form an integrated convex rounded front face that has a common outward arc or spherical shape arcing outward.

Although being formed from a single lens-like piece of material such as polycarbonate, the cover 514 has two different regions or portions including an outer portion 514o and a central portion 514i. According to some embodiments, the cover 514 is darkened around the outer portion 514o, but leaves the central portion 514i visibly clear so as to facilitate viewing of an electronic display 516 disposed underneath. According to some embodiments, the cover 514 acts as a lens that tends to magnify the information being displayed in electronic display 516 to users. According to some embodiments the central electronic display 516 is a dot-matrix layout (i.e. individually addressable) such that arbitrary shapes can be generated. According to some embodiments, electronic display 516 is a backlit, color liquid crystal display (LCD). An example of information displayed on the electronic display 516 is illustrated in FIG. 5A, and includes central numerals 520 that are representative of a current setpoint temperature. The thermostat 102 may be constructed such that the electronic display 516 is at a fixed orientation and does not rotate with the outer rotatable ring 512. For some embodiments, the cover 514 and lens 510 also remain at a fixed orientation and do not rotate with the outer ring 512. In alternative embodiments, the cover 514 and/or the lens 510 can rotate with the outer rotatable ring 512. According to one embodiment in which the diameter of the thermostat 102 is about 84 mm, the diameter of the electronic display 516 is about 54 mm. According to some embodiments the curved shape of the front surface of thermostat 102, which is made up of the cover 514, the lens 510 and the front facing portion of the ring 512, is spherical, and matches a sphere having a radius of between 100 mm and 180 mm. According to some embodiments, the radius of the spherical shape of the thermostat front is about 156 mm.

Motion sensing with PIR sensor 550 as well as other techniques can be used in the detection and/or prediction of occupancy. According to some embodiments, occupancy information is used in generating an effective and efficient scheduled program. A second near-field proximity sensor 552 is also provided to detect an approaching user. The near-field proximity sensor 552 can be used to detect proximity in the range of up to 10-15 feet. the PIR sensor 550 and/or the near-field proximity sensor 552 can detect user presence such that the thermostat 102 can initiate "waking up" and/or providing adaptive screen displays that are based on user motion/position when the user is approaching the thermostat and prior to the user touching the thermostat.

Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place.

According to some embodiments, the thermostat 102 may be controlled by at least two types of user input, the first being a rotation of the outer rotatable ring 512 as shown in FIG. 5A, and the second being an inward push on head unit 540 until an audible and/or tactile "click" occurs. For such embodiments, the head unit 540 is an assembly that includes the outer ring 512, the cover 514, the electronic display 516, and the lens 510. When pressed inwardly by the user, the head unit 540 travels inwardly by a small amount, such as 0.5 mm, against an interior switch (not shown), and then springably travels back out when the inward pressure is released, providing a tactile "click" along with a corresponding audible clicking sound. Thus, for the embodiment of FIGS. 5A-5B, an inward click can be achieved by direct pressing on the outer rotatable ring 512 itself, or by indirect pressing of the outer rotatable ring 512 by virtue of providing inward pressure on the cover 514, the lens 510, or by various combinations thereof. For other embodiments, the thermostat 102 can be mechanically configured such that only the outer ring 512 travels inwardly for the inward click input, while the cover 514 and lens 510 remain motionless.

FIG. 5B illustrates a right side elevation view of the thermostat 102. According to some embodiments, the thermostat 102 includes a processing system 560, display driver 564 and a wireless communications system 566. The processing system 560 is adapted to cause the display driver 564 and display 516 to display information to the user, and to receive user input via the outer rotatable ring 512. The processing system 560, according to some embodiments, is capable of carrying out the governance of the operation of thermostat 102 including various user interface features. The processing system 560 is further programmed and configured to carry out other operations, such as maintaining and updating a thermodynamic model for the enclosure in which the HVAC system is installed. According to some embodiments, a wireless communications system 566 is used to communicate with devices such as personal computers, other thermostats or HVAC system components, smart phones, local home wireless networks, routers, gateways, home appliances, security systems, hazard detectors, remote thermostat management servers, distributed sensors and/or sensor systems, and other components it the modern smart-home environment. Such communications may include peer-to-peer communications, communications through one or more servers located on a private network, or and/or communications through a cloud-based service.

According to some embodiments, the thermostat 102 includes a head unit 540 and a backplate (or wall dock) 542. Head unit 540 of thermostat 102 is slidably mountable onto back plate 542 and slidably detachable therefrom. According to some embodiments the connection of the head unit 540 to backplate 542 can be accomplished using magnets, bayonet, latches and catches, tabs, and/or ribs with matching indentations, or simply friction on mating portions of the head unit 540 and backplate 542. Also shown in FIG. 5A is a rechargeable battery 522 that is recharged using recharging circuitry 524 that uses power from backplate that is either obtained via power harvesting (also referred to as power stealing and/or power sharing) from the HVAC system control circuit (s) or from a common wire, if available. According to some embodiments, the rechargeable battery 522 may include a single cell lithium-ion battery, or a lithium-polymer battery.

FIGS. 6A-6D illustrate exploded front and rear perspective views, respectively, of the thermostat 102 with respect to its two main components, which are the head unit 540 and the backplate 542. In the drawings shown herein, the "z" direction is outward from the wall, the "y" direction is the toe-to-head direction relative to a walk-up user, and the "x" direction is the user's left-to-right direction.

Figure 6A:
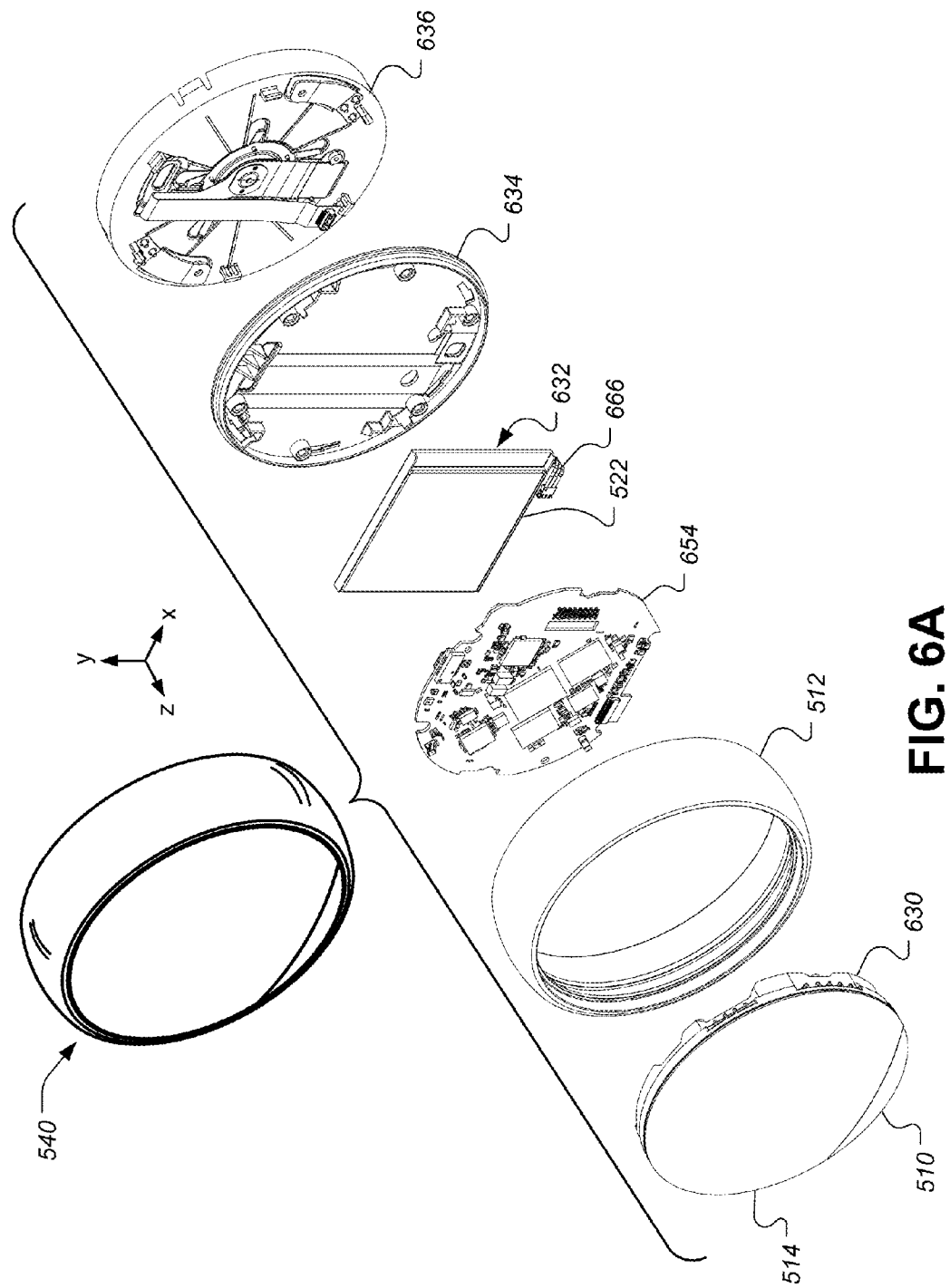
FIG. 6A illustrates an exploded front perspective view of a head unit with respect to its primary components, according to some embodiments.

FIG. 6A illustrates an exploded front perspective view of the head unit 540 with respect to its primary components. Head unit 540 includes, a back cover 636, a bottom frame 634, a battery assembly 632 with the rechargeable battery 522, a head unit printed circuit board (PCB) 654, the outer rotatable ring 512, the cover 514, and the lens 510. Behind the lens is the display assembly 630, which will be described in relation to FIG. 6B below. Electrical components on the head unit PCB 654 can connect to electrical components on the back plate 542 by virtue of a plug-type electrical connector on the back cover 636. The head unit PCB 654 is secured to head unit back cover 636 and display assembly 630. The outer rotatable ring 512 is held between a bearing surface on the display assembly 630 and bearing surfaces on the bottom frame 634. Motion of the outer rotatable ring 512 in the z direction is constrained by flat bearing surfaces on the display assembly 630 and bottom frame 634, while motion of the ring in x and y directions are constrained at least in part by circular rounded surfaces on the bottom frame 634. According to some embodiments, the bearing surfaces of the bottom frame 634 and/or the display assembly 630 are greased and/or otherwise lubricated to both smooth and dampen rotational movement for the outer ring 512. The head unit printed PCB 654 may include some or all of processing system 560, display driver 564, wireless communication system 566, and battery recharging circuitry 524 as shown and described with respect to FIG. 5A, as well as one or more additional memory storage components. According to some embodiments, circuitry and components are mounted on both sides of head unit PCB 654. Although not shown, according to some embodiments, shielding can surround circuitry and components on both sides of the head unit PCB 654.

Battery assembly 632 includes a rechargeable battery 522. Battery assembly 632 also includes connecting wires 666, and a battery mounting film that is attached to battery 522 using a strong adhesive and/or the any rear shielding of head unit PCB 654 using a relatively weaker adhesive. According to some embodiments, the battery assembly 632 is user-replaceable.

Figure 6B:
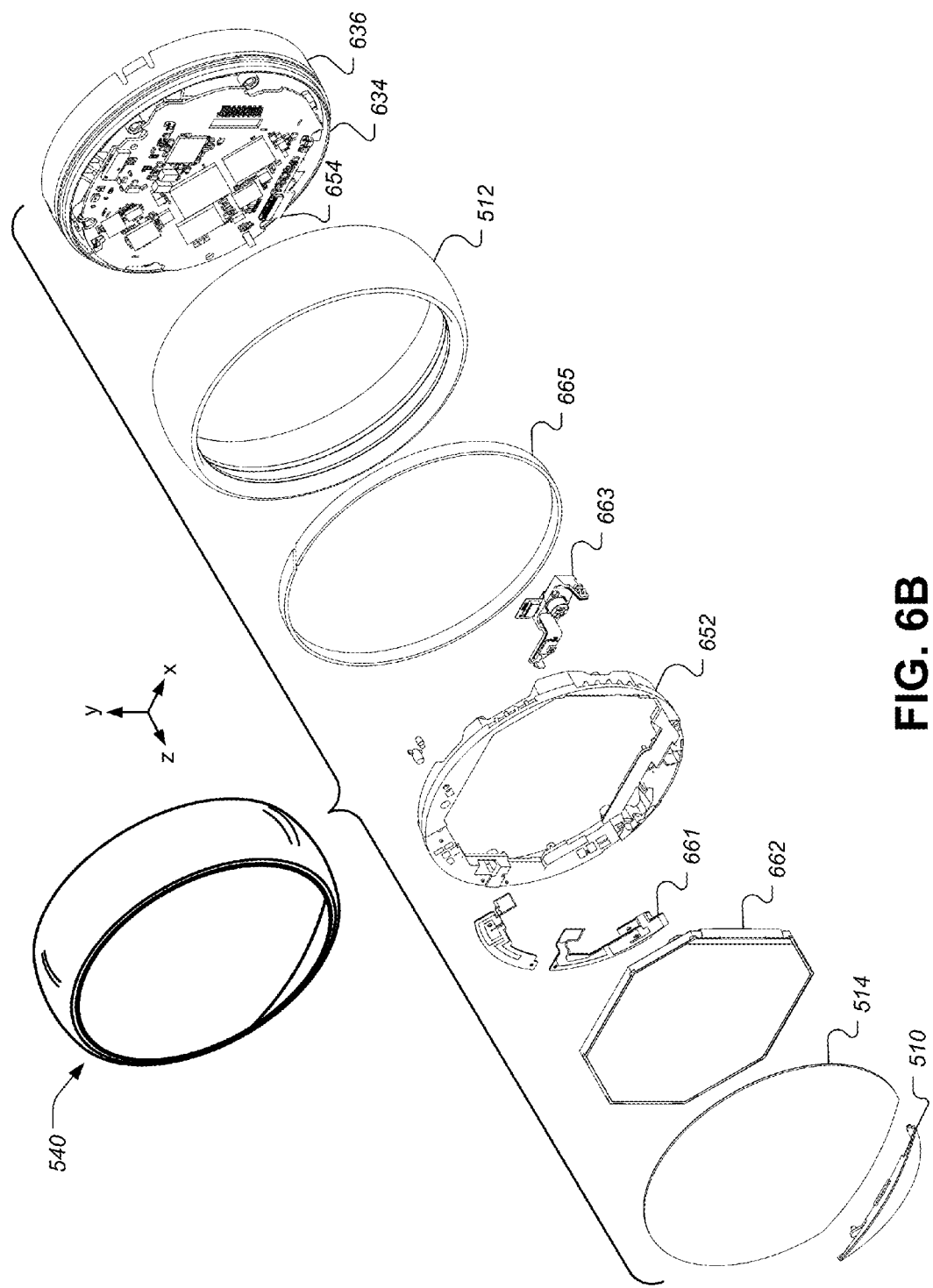
FIG. 6B illustrates an exploded front perspective view of a head unit display assembly with respect to its primary components, according to some embodiments.

FIG. 6B illustrates an exploded front perspective view of the head unit 540 with an exploded view of the display assembly 630. The display assembly 630 comprises the cover 514, the lens 510, an LCD module 662, a pair of RF antennas 661, a head unit top frame 652, a sensor flex assembly 663, and a magnetic ring 665. The sensor flex assembly 663 connects to the head unit PCB 654 using a connector on a flexible PCB. The sensor flex assembly 663 also includes the PIR sensor 550 and the near-field proximity sensor 552. Additionally, the sensor flex assembly 663 may include a temperature sensor IC that is positioned close to the lens 515 so as to accurately measure temperature outside of the thermostat 102 without being overly affected by internal heating of thermostat components. The sensor flex assembly 663 may be comprised of these three sensors, along with a flexible PCB (including the connector for the head unit PCB 654) and a plastic bracket to which the sensors and flexible PCB are mounted. The bracket ensures that the sensor flex assembly 663 is positioned and oriented consistently and correctly with respect to the lens 510. The lens 510 includes two sections that are thinned to approximately 0.3 mm in front of the near-field proximity sensor 552 and the temperature sensor. The lens 510 also includes a section with a Fresnel lens pattern in front of the PIR sensor 550. In some embodiments, additional temperature sensors may be placed throughout the thermostat 102, such as a temperature sensor on the head unit PCB 654 and a temperature sensor on the back plate PCB 680.

The head unit PCB 554 includes a Hall effect sensor that senses rotation of the magnetic ring 665. The magnetic ring 665 is mounted to the inside of the outer rotatable ring 512 using an adhesive such that the outer rotatable ring 512 and the magnetic ring 665 are rotated together. The magnetic ring 665 includes striated sections of alternating magnetic polarity that are diagonally positioned around the magnetic ring 665. The Hall effect sensor senses the alternations between magnetic polarities as the outer ring 512 is rotated. The Hall effect sensor can be controlled by a primary processor, which is a higher powered processor, without excessive power drain implications because the primary processor will invariably be awake already when the user is manually turning the outer rotatable ring 512 to control the user interface. Advantageously, very fast response times can also be provided by the primary processor.

The antennas 661 are mounted to the top surface of the head unit top frame 652. The wireless communications system 566 may include Wi-Fi radios of various frequencies (e.g., 2.4 GHz and 5.0 GHz), along with an IEEE 802.15.4-compliant radio unit for a local-area smart home device network that may include other thermostats, hazard detectors, security system modules, and so forth. The IEEE 802.15.4 unit may use the Thread protocol for achieving such communications. In some embodiments, the wireless communications system 566 may also include a Bluetooth low energy (BLE) radio for communication with user devices.

The processing system 560 may be primarily located on the head unit PCB 654 and may include a primary processor and a secondary processor. The primary processor may be a comparatively high-powered processor, such as the AM3703 chip, or the MCIMX6X3EVK10AB chip from Freescale™, and may be programmed to perform sophisticated thermostat operations, such as time-to-temperature calculations, occupancy determination algorithms, ambient temperature compensation calculations, software updates, wireless transmissions, operation of the display driver 564, and regulation of the recharging circuitry 524. The secondary processor, such as the STM32L chip from ST microelectronics, may be a comparatively low-power processor when compared to the primary processor. The secondary processor may interact with the HVAC system to control a series of FET switches that control the functioning of the HVAC system. The secondary processor may also interface with various sensors in thermostat 102, such as the temperature sensors, a humidity sensor, an ambient light sensor, and/or the like. The secondary processor may also share duties with the primary processor in regulating the recharging circuitry 522 to provide power to all of the electrical systems on board the thermostat 102. Generally, the primary processor will operate in a "sleep" mode until high-power processing operations (e.g., wireless communications, user interface interactions, time-to-temperature calculations, thermal model calculations, etc.) are required, while the secondary processor will operate in an "awake" mode more often than the primary processor in order to monitor environmental sensors and wake the primary processor when needed.

FIGS. 6C-6D illustrate exploded front and rear perspective views, respectively, of the back plate unit 542 with respect to its primary components, according to some embodiments. Back plate unit 542 comprises a back plate rear plate 682, a back plate PCB 680, and a back plate cover 670. Visible in FIG. 6C are the HVAC wire connectors 684 that include integrated mechanical wire insertion sensing circuitry, and relatively large capacitors 686 that are used by part of the power stealing circuitry that is mounted on the back plate PCB 680. According to some embodiments, backplate 542 includes electronics and a temperature/humidity sensor in housing. Wire connectors 684 are provided to allow for connection to HVAC system wires, which pass though the large central circular opening 690, which is visible in each of the backplate primary components. Also visible in each of the backplate primary components are two mounting holes 692 and 694 for use in fixing the backplate to the wall. Also visible in FIGS. 6C-6D are a bubble level 672 to allow the user to install the thermostat 102 in a level position without additional tools.

The back plate PCB 680 also may include approximately seven custom power isolation ICs 685 that isolate the internal electronics of the thermostat 102 from the relatively high 24 VAC signals of the HVAC system. The power isolation ICs 685 are custom software-resettable fuses that both monitor transient and anomalous voltage/current signals on the HVAC power/return wires and switch off the connection to isolate the thermostat against any dangerous signals that could damage the internal electronics. The power isolation ICs 685 receive command signals encoded in a clock square wave from the processing system 560 to open and close a pair of power FETs for each HVAC return wire in order to activate the corresponding HVAC function (e.g., fan, air-conditioning, heat, heat pump, etc.).

Figure 7:
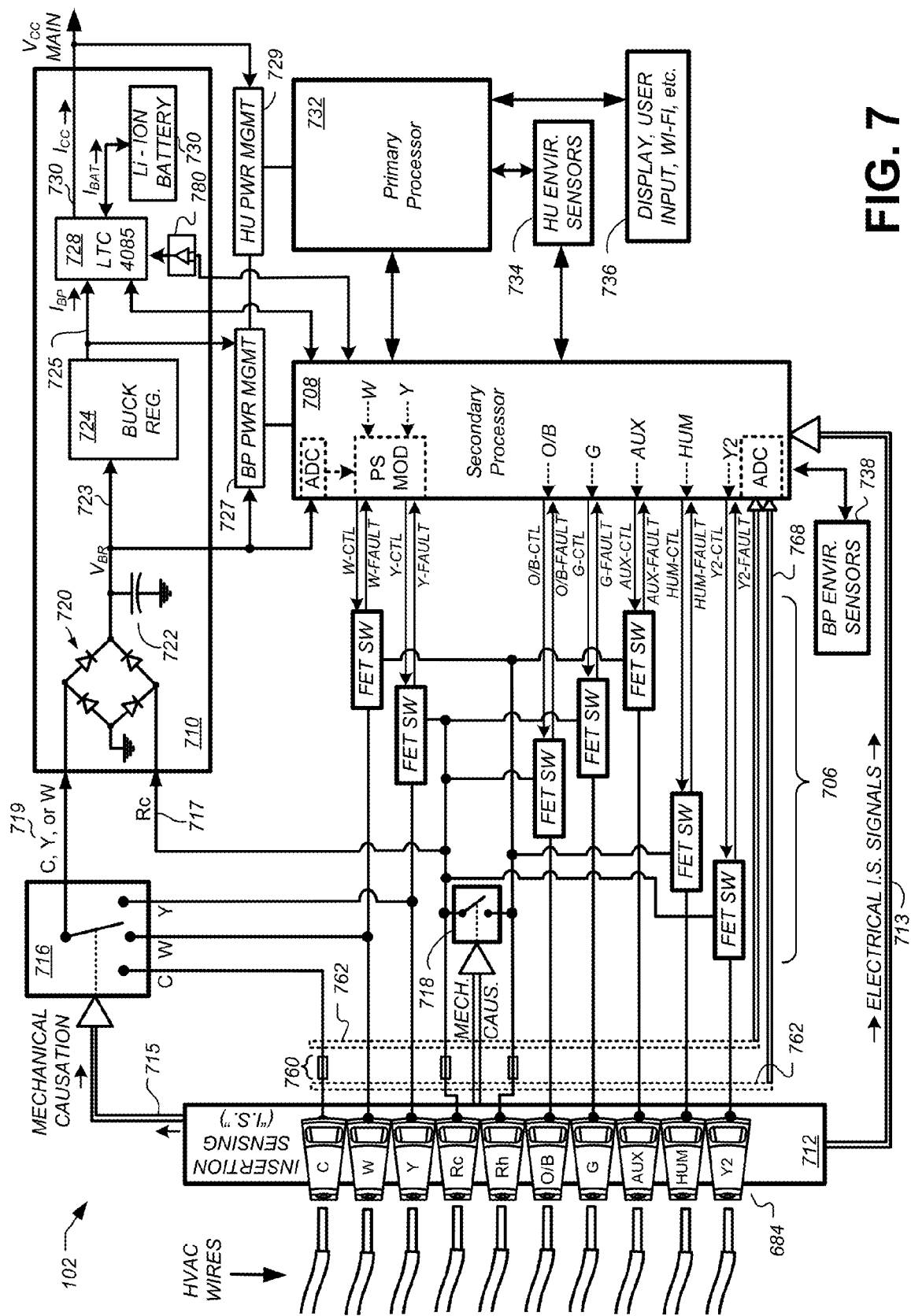
FIG. 7 illustrates a block diagram illustrating circuitry within a thermostat, according to some embodiments.

FIG. 7 illustrates a power management and power harvesting system for a smart thermostat, according to some embodiments. FIG. 7 shows connections to common HVAC wiring, such as a W (heat call relay wire); Y (cooling call relay wire); Y2 (second stage cooling call relay wire); Rh (heat call relay power); Rc (cooling call relay power); G (fan call relay wire); O/B (heat pump call relay wire); AUX (auxiliary call relay wire); HUM (humidifier call relay wire); and C (common wire). As discussed above, the thermostat 102 comprises a plurality of FET switches 706 (such as the power isolation ICs 685 of FIG. 6D above) used for carrying out the essential thermostat operations of connecting or "shorting" one or more selected pairs of HVAC wires together according to the desired HVAC operation. The operation of each of the FET switches 706 is controlled by the secondary processor 708 which can comprise, for example, an STM32L 32-bit ultra-low power ARM-based microprocessor available from ST Microelectronics.

Thermostat 102 further comprises powering circuitry 710 that comprises components contained on both the backplate 542 and head unit 540. Generally speaking, it is the purpose of powering circuitry 710 to extract electrical operating power from the HVAC wires and convert that power into a usable form for the many electrically-driven components of the thermostat 102. Thermostat 102 further comprises insertion sensing components 712 configured to provide automated mechanical and electrical sensing regarding the HVAC wires that are inserted into the thermostat 102. Thermostat 102 further comprises a relatively high-power primary processor 732, such as an AM3703 Sitara ARM microprocessor available from Texas Instruments, that provides the main general governance of the operation of the thermostat 102. Thermostat 102 further comprises environmental sensors 734/738 (e.g., temperature sensors, humidity sensors, active IR motion sensors, passive IR motion sensors, multi-channel thermopiles, ambient visible light sensors, accelerometers, ambient sound sensors, ultrasonic/infrasonic sound sensors, microwave sensors, GPS sensors, etc.), as well as other components 736 (e.g., electronic display devices and circuitry, user interface devices and circuitry, wired communications circuitry, wireless communications circuitry, etc.) that are operatively coupled to the primary processor 732 and/or secondary processor 708 and collectively configured to provide the functionalities described in the instant disclosure.

The insertion sensing components 712 include a plurality of HVAC wiring connectors 684, each containing an internal springable mechanical assembly that, responsive to the mechanical insertion of a physical wire thereinto, will mechanically cause an opening or closing of one or more dedicated electrical switches associated therewith. With respect to the HVAC wiring connectors 684 that are dedicated to the C, W, Y, Rc, and Rh terminals, those dedicated electrical switches are, in turn, networked together in a manner that yields the results that are illustrated in FIG. 7 by the blocks 716 and 718. The output of block 716, which is provided at a node 719, is dictated solely by virtue of the particular combination of C, W, and Y connectors into which wires have been mechanically inserted in accordance with the following rules: if a wire is inserted into the C connector, then the node 719 becomes the C node regardless of whether there are any wires inserted into the Y or W connectors; if no wire is inserted into the C connector and a wire is inserted into the Y connector, then the node 719 becomes the Y node regardless of whether there is a wire inserted into the W connector; and if no wire is inserted into either of the C or Y connectors, then the node 719 becomes the W node. Block 718 is shown as being coupled to the internal sensing components 712 by virtue of double lines termed "mechanical causation," for the purpose of denoting that its operation, which is either to short the Rc and Rh nodes together or not to short the Rc and Rh nodes together. Whether the block 718 will short, or not short, the Rc and Rh nodes together is dictated solely by virtue of the particular combination of Rc and Rh connectors into which wires have been mechanically inserted. Block 718 will keep the Rc and Rh nodes shorted together, unless wires have been inserted into both the Rc and Rh connectors, in which case the block 718 will not short the Rc and Rh nodes together because a two-HVAC-transformer system is present. The insertion sensing circuitry 712 is also configured to provide at least two signals to the secondary processor 708, the first being a simple "open" or "short" signal that corresponds to the mechanical insertion of a wire, and the second being a voltage or other level signal that represents a sensed electrical signal at that terminal. The first and second electrical signals for each of the respective wiring terminals can advantageously be used as a basis for basic "sanity checking" to help detect and avoid erroneous wiring conditions.

Basic operation of each of the FET switches 706 is achieved by virtue of a respective control signal (e.g., W-CTL, Y-CTL) provided by the secondary processor 708 that causes the corresponding FET switch 706 to "connect" or "short" its respective HVAC lead inputs for an ON control signal, and that causes the corresponding FET switch 706 to "disconnect" or "leave open" or "open up" its respective HVAC lead inputs for an "OFF" control signal. By virtue of the above-described operation of block 718, it is automatically the case that for single-transformer systems having only an "R" wire (rather than separate Rc and Rh wires as would be present for two-transformer systems), that "R" wire can be inserted into either of the Rc or Rh terminals, and the Rh-Rc nodes will be automatically shorted to form a single "R" node, as needed for proper operation. In contrast, for dual-transformer systems, the insertion of two separate wires into the respective Rc and Rh terminals will cause the Rh-Rc nodes to remain disconnected to maintain two separate Rc and Rh nodes, as needed for proper operation.

Referring now to the powering circuitry 710 in FIG. 7, provided is a configuration that automatically adapts to the powering situation presented to the thermostat 102 at the time of installation and thereafter. The powering circuitry 710 comprises a full-wave bridge rectifier 720, a storage and waveform-smoothing bridge output capacitor 722 (which can be, for example, on the order of 30 microfarads), a buck regulator circuit system 724, a power-and-battery (PAB) regulation circuit 728, and a rechargeable lithium-ion battery 730. In conjunction with other control circuitry including backplate power management circuitry 727, head unit power management circuitry 729, and the secondary processor 708, the powering circuitry 710 is configured and adapted to have the characteristics and functionality described hereinbelow.

By virtue of the configuration illustrated in FIG. 7, when there is a "C" wire presented upon installation, the powering circuitry 710 operates as a relatively high-powered, rechargeable-battery-assisted AC-to-DC converting power supply. When there is not a "C" wire presented, the powering circuitry 710 operates as a power-stealing, rechargeable-battery-assisted AC-to-DC converting power supply. As illustrated in FIG. 7, the powering circuitry 710 generally serves to provide the voltage Vcc MAIN that is used by the various electrical components of the thermostat 102, and that in one embodiment will usually be about 3.7V~3.95V. The general purpose of powering circuitry 710 is to convert the 24 VAC presented between the input leads 719 and 717 to a steady DC voltage output at the Vcc MAIN node to supply the thermostat electrical power load.

Operation of the powering circuitry 710 for the case in which the "C" wire is present is now described. When the 24 VAC input voltage between nodes 719 and 717 is rectified by the full-wave bridge rectifier 720, a DC voltage at node 723 is present across the bridge output capacitor 722, and this DC voltage is converted by the buck regulator system 724 to a relatively steady voltage, such as 4.4 volts, at node 725, which provides an input current $I_{BP}$ to the power-and-battery (PAB) regulation circuit 728.

The secondary processor 708 controls the operation of the powering circuitry 710 at least by virtue of control leads leading between the secondary processor 708 and the PAB regulation circuit 728, which for one embodiment can include an LTC4085-4 chip available from Linear Technologies Corporation. The LTC4085-4 is a USB power manager and Li-Ion/Polymer battery charger originally designed for portable battery-powered applications. The PAB regulation circuit 728 provides the ability for the secondary processor 708 to specify a maximum value $I_{BP}(max)$ for the input current $I_{BP}$. The PAB regulation circuit 728 is configured to keep the input current at or below $I_{BP}(max)$, while also providing a steady output voltage Vcc, such as 4.0 volts, while also providing an output current Icc that is sufficient to satisfy the thermostat electrical power load, while also tending to the charging of the rechargeable battery 730 as needed when excess power is available, and while also tending to the proper discharging of the rechargeable battery 730 as needed when additional power (beyond what can be provided at the maximum input current $I_{BP}(max)$) is needed to satisfy the thermostat electrical power load.

Operation of the powering circuitry 710 for the case in which the "C" wire is not present is now described. As used herein, "inactive power stealing" refers to the power stealing that is performed during periods in which there is no active call in place based on the lead from which power is being stolen. As used herein, "active power stealing" refers to the power stealing that is performed during periods in which there is an active call in place based on the lead from which power is being stolen.

During inactive power stealing, power is stolen from between, for example, the "Y" wire that appears at node 719 and the Rc lead that appears at node 717. There will be a 24 VAC HVAC transformer voltage present across nodes 719/717 when no cooling call is in place (i.e., when the Y-Rc FET switch is open). For one embodiment, the maximum current $I_{BP}(max)$ is set to a relatively modest value, such as 20 mA, for the case of inactive power stealing. Assuming a voltage of about 4.4 volts at node 725, this corresponds to a maximum output power from the buck regulator system 724 of about 88 mW. This power level of 88 mW has been found to not accidentally trip the HVAC system into an "on" state due to the current following through the call relay coil. During this time period, the PAB regulator 728 operates to discharge the battery 730 during any periods of operation in which the instantaneous thermostat electrical power load rises above 88 mW, and to recharge the battery (if needed) when the instantaneous thermostat electrical power load drops below 88 mW. The thermostat 700 is configured such that the average power consumption is well below 88 mW, and indeed for some embodiments is even below 10 mW on a long-term time average.

Operation of the powering circuitry 710 for "active power stealing" is now described. During an active heating/cooling call, it is necessary for current to be flowing through the HVAC call relay coil sufficient to maintain the HVAC call relay in a "tripped" or ON state at all times during the active heating/cooling call. The secondary processor 708 is configured by virtue of circuitry denoted "PS MOD" to turn, for example, the Y-Rc FET switch OFF for small periods of time during the active cooling call, wherein the periods of time are small enough such that the cooling call relay does not "un-trip" into an OFF state, but wherein the periods of time are long enough to allow inrush of current into the bridge rectifier 720 to keep the bridge output capacitor 722 to a reasonably acceptable operating level. For one embodiment, this is achieved in a closed-loop fashion in which the secondary processor 708 monitors the voltage $V_{BR}$ at node 723 and actuates the signal Y-CTL as necessary to keep the bridge output capacitor 722 charged. According to one embodiment, it has been found advantageous to introduce a delay period, such as 60-90 seconds, following the instantiation of an active heating/cooling cycle before instantiating the active power stealing process. This delay period has been found useful in allowing many real-world HVAC systems to reach a kind of "quiescent" operating state in which they will be much less likely to accidentally un-trip away from the active cooling cycle due to active power stealing operation of the thermostat 102. According to another embodiment, it has been found further advantageous to introduce another delay period, such as 60-90 seconds, following the termination of an active cooling cycle before instantiating the inactive power stealing process. This delay period has likewise been found useful in allowing the various HVAC systems to reach a quiescent state in which accidental tripping back into an active cooling cycle is avoided.

Time-of-Use Architecture

Embodiments discussed herein generally relate to techniques for enrolling customers in a time-of-use (ToU) rate plan, providing an intelligent thermostat that is capable of dynamically adjusting a learned setpoint schedule to accommodate the ToU rate plan, providing an Application Programming Interface (API) at a thermostat management server for receiving ToU rate plan information and enrollment information from an energy provider, and transmitting such information to the intelligent thermostat and user interfaces on mobile devise and personal computing devices. The entities in a system for managing ToU programs and events may include a utility provider that provides electrical or other forms of energy from a power source (e.g., an electrical generator) to individual homes or businesses. In some embodiments a thermostat management server is disposed between a utility provider computer system and a plurality of structures. The thermostat management server operates to intelligently and effectively control individual thermostats in the structures to modify HVAC energy consumption during ToU intervals. Such modification is usually performed so as to minimize HVAC usage during a high-energy-cost period compared to energy usage during a low-energy-cost period. Some embodiments may also preform preconditioning of the home (e.g., lowering the temperature before the high-cost interval during the summer). This allows that thermostat to use the home like a battery to store some of the energy needed during the high-cost interval.

The thermostat management server according to many embodiments interfaces with an intelligent, network-connected thermostat installed in each structure, such as the thermostat described above in relation to FIGS. 5-7. Such a thermostat can acquire information about the residence, a likelihood of the residence being occupied (via occupancy sensors that, over time, can build an occupancy probability profile), a weather forecast, a real-time weather status, a real-time occupancy, etc. Moreover, the thermostat can be programmed by its users or may learn, over time, the preferences and habits of its users to set scheduled setpoints that include a target temperature and a time. In some embodiments, a population of such network-connected thermostats associated with a respective population of individual structures may be configured to communicate with the thermostat management server. Each network-connected thermostat may be associated with one or more accounts managed by the thermostat management server, and data may be sent back and forth as needed between each network-connected thermostat and the thermostat management server for providing a variety of advantageous functionalities, such as facilitating remote control, reporting weather data, reporting HVAC control data and status information, and/or providing the centralized and/or partially centralized control and data communications required to carry out DR-related, ToU-related, efficiency-related, and/or real-time rate functionalities described herein.

It is to be appreciated that some embodiments herein may be particularly suitable and advantageous for commercial scenarios in which the thermostat management server associated with the population of network-connected thermostats is a separate and distinct business entity from the utilities providers themselves.

Figure 8:
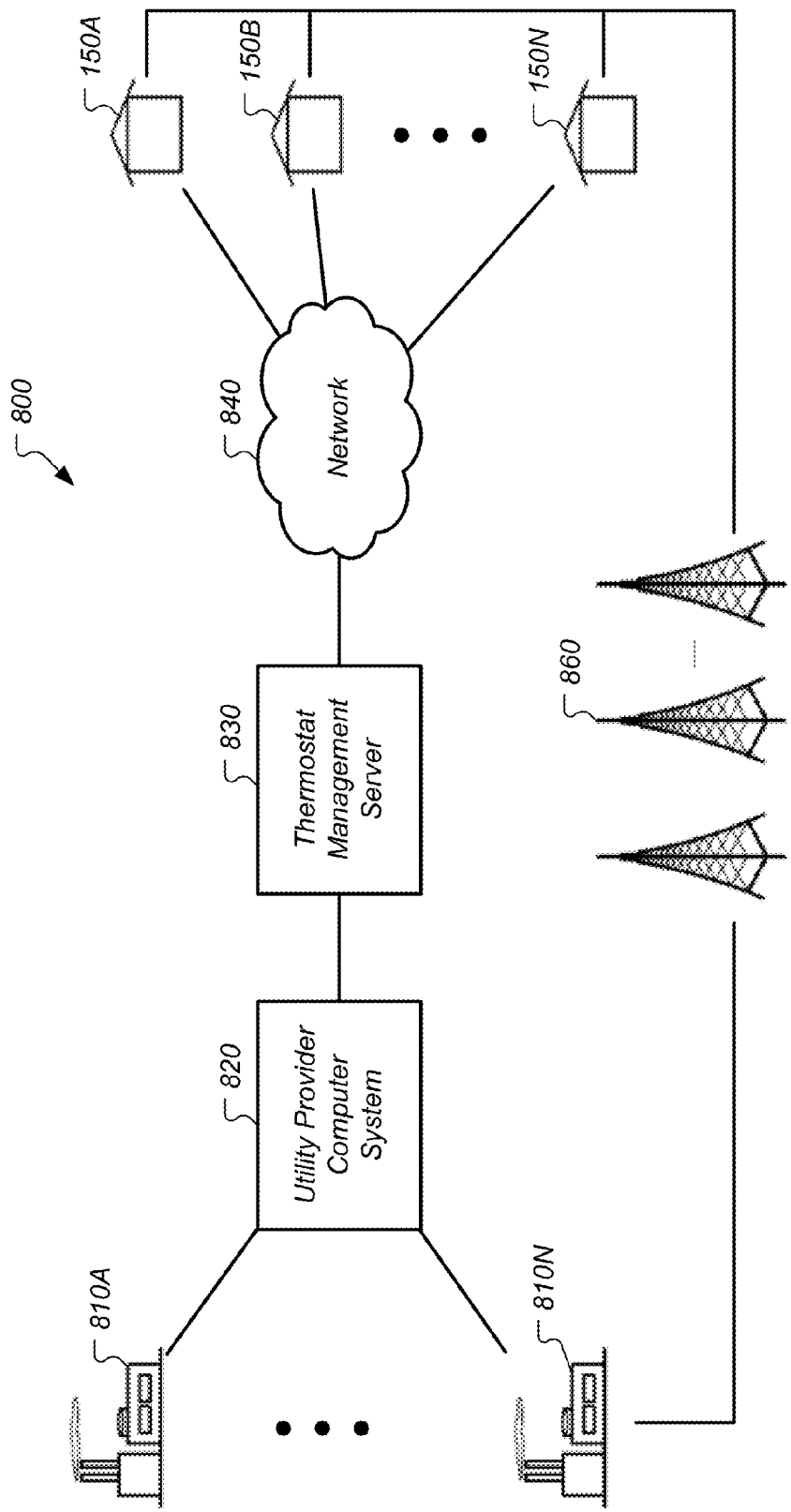
FIG. 8 depicts a system for managing ToU programs and events according to some embodiments.

FIG. 8 depicts a system 800 for managing ToU programs and events according to some embodiments. System 800 includes a plurality of electrical power generators 810A-810N, a utility provider computing system 820, a thermostat management server 830, a communication network 840, a plurality of energy consumer structures 150A-150N, and a power distribution network 860.

Electrical power generators 810 are operable to generate electricity or other type of energy (e.g., natural gas) using one or more of a variety of techniques known in the art. For example, electrical power generators 810 may include hydroelectric systems, nuclear power plants, fossil-fuel based power plants, solar plants, wind plants, gas processing plants, etc. The amount of electricity that may be generated at any given time may be limited to some maximum energy supplied that is determined by the generators 810. Further, the electrical power generators 810 may be owned and managed by a utility provider implementing the utility provider computing system 820, or may be owned and/or managed by one or more third party entities that contract with the utility provider to provide source energy to customers of the utility provider.

Utility provider computer system 820 may include a computing system operable to communicate with one or more of the electrical power generators 810A-810N and the thermostat management server 830. The utility provider associated with the utility provider computer system 820 typically manages the distribution of electricity from the electrical power generators 810A-810N to energy consumers at the structures 150A-150N. This management includes ensuring the electricity is successfully communicated from the power generators 810A-810N to the structures 150A-150N, monitoring the amount of energy consumption at each of the structures 150A-150N, and collecting fees from occupants of the structures 150A-150N in accordance with the their respective monitored amount of energy consumption. The utility provider computer system 820 may perform one or more of the operations described herein, and may include a variety of computer processors, storage elements, communication mechanisms, etc. as further described herein and as necessary to facilitate the described operations.

Thermostat management server 830 may include a computing system operable to intelligently and efficiently manage the HVAC energy consumption at one or more of the structures 150A-150N while optionally providing reporting and control mechanisms to the utility provider computing system 820. The thermostat management server 830 may be operable to engage in real-time two-way communications with thermostat devices associated with the structures 150A-150N via the network 840, as well as engage in real-time two-way communications with the utility provider computer system 820. The thermostat management server 830 may perform one or more of the operations described herein, and may include a variety of computer processors, storage elements, communication mechanisms, etc. as further described herein and as necessary to facilitate the described operations. Specifically, the thermostat management server 830 may include a plurality of servers, databases, and/or cloud platform/services, distributed across various locations.

Network 840 may include any suitable network for enabling communications between various entities, such as between one or more components of the thermostat management server 830 and one or more electronic devices associated with one or more of the structures 150A-150N. Such a network may include, for example, a local area network, a wide-area network, a virtual private network, the Internet, an intranet, an extranet, a public switched telephone network, an infrared network, a wireless network, a wireless data network, a cellular network, or any other such wired or wireless network(s) or combination(s) thereof. The network

840 may, furthermore, incorporate any suitable network topology. Network 840 may utilize any suitable protocol, and communication over the network 840 may be enabled by wired or wireless connections, and any combinations thereof.

Structures 150A-150N may include a variety of structures or enclosures that are associated with HVAC energy consumption. The structures may span a variety of structural types, such as private residences, houses, apartments, condominiums, schools, commercial properties, single or multi-level office buildings, and/or manufacturing facilities. A number of examples described herein refer to the structure as being a private residence in the form of a house, but embodiments are not so limited as one skilled in the art would understand that the techniques described herein could equally be applicable to other types of structures. It is to be appreciated that, while some embodiments may be particularly advantageous for residential living scenarios, the scope of the present teachings is not so limited and may equally be advantageous for business environments, school environments, government building environments, sports or entertainment arenas, and so forth. Thus, while many of the descriptions below are set forth in a residential living context, it is to be appreciated that this is for purposes of clarity of description and not by way of limitation.

The structures 150A-150N typically include one or more energy consumption devices, which could be electrical energy consumption devices such as televisions, microwaves, home audio equipment, heating/cooling systems, laundry machines, dishwashers, etc. Similarly, energy consumption devices could include one or more other types of energy consumption devices such as gas consumption devices. For example, the structures 150A-150N may include a natural gas (air/water/etc.) heater, stove, fireplace, etc. The structures 150A-150N in many embodiments include an intelligent, network connected thermostat that is operable to control the thermal environment of the residence. For some embodiments, some or all of the intelligent, network-connected thermostats may be the same as or similar in functionality to the NEST LEARNING THERMOSTAT® available from Google, Inc. of Palo Alto, Calif.

Power distribution network 860 may include any suitable network for transferring energy from one or more of the electrical power generators 810A-810N to one or more of the structures 150A-150N. In an electrical distribution network, power distribution network 860 may include a variety of power lines, substations, pole-mounted transformers, and the like as known in the art for carrying electricity from the electrical power generators 810A-810N to the structures 150A-150N. In a gas distribution network, power distribution network 860 may include a variety of compressor stations, storage elements, pipes, and/or the like for transporting natural or other types of energy producing gas from the power generators 810A-810N (in this embodiment, gas wells and/or processing plants) to the structures 150A-150N.

System 800 in certain embodiments may be a distributed system utilizing several computer systems and components that are interconnected via communication links using one or more computer networks or direct connections. However, it will be appreciated by those skilled in the art that such a system could operate equally well in a system having fewer or a greater number of components than are illustrated in FIG. 8. Thus, the depiction of system 800 in FIG. 8 should be taken as being illustrative in nature, and not as limiting the scope of the present embodiments.

Energy providers face variable rates for energy during different yearly seasons and even throughout the hours of a single day. Energy rates for utility providers to purchase energy from the electrical power generators 810A-810N are often low in the morning and late at night, and then climb during peak-power usage hours in the late afternoon as customers run their air conditioners more extensively. However, many rate plans offered by energy providers to customers use a standard energy rate that does not track with the varying energy rate borne by the energy providers to generate and deliver energy to customers. In order to more accurately pass the costs of energy onto customers, energy providers are beginning to offer ToU rates more widely. These pricing plans mean that customers are offered different rates for energy at different times of the day.

Figure 9:
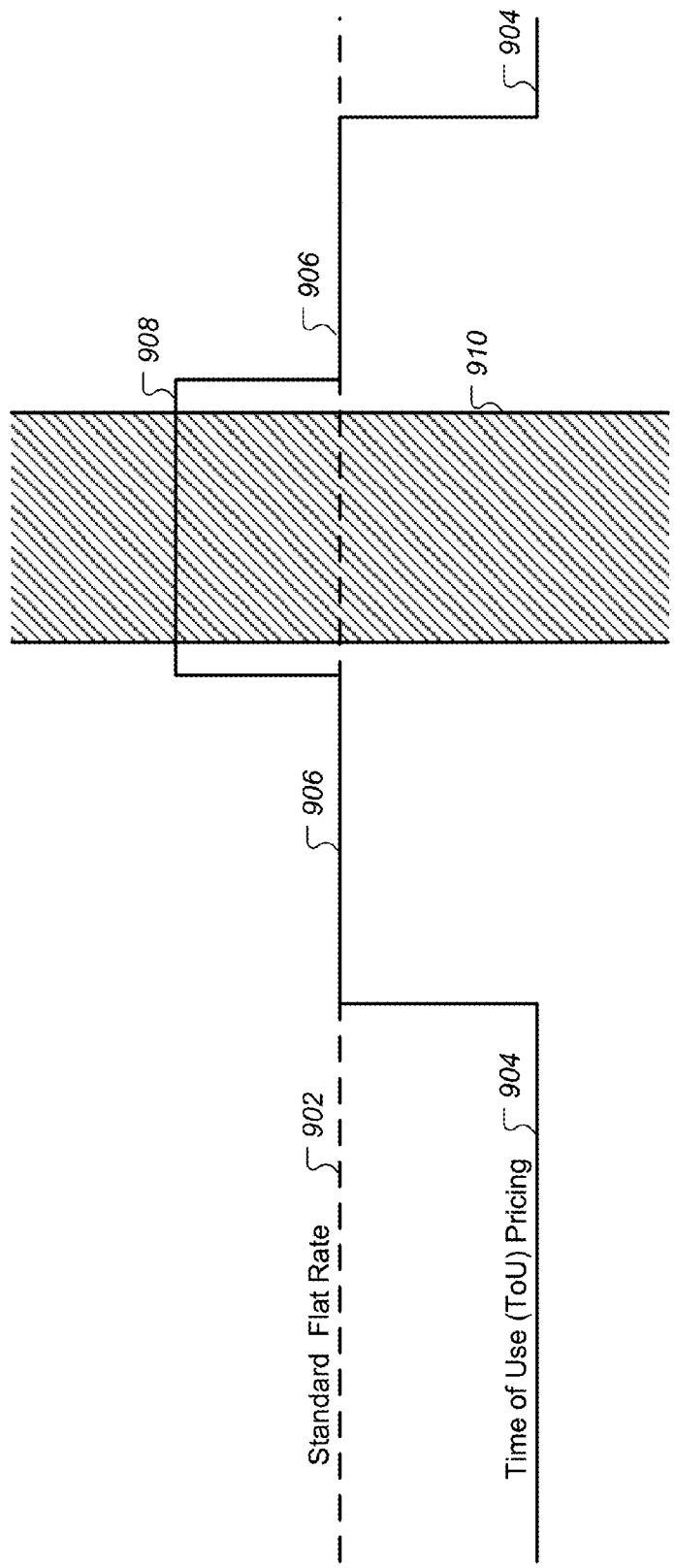
FIG. 9 illustrates a ToU rate model, according to some embodiments.

FIG. 9 illustrates a ToU rate model, according to some embodiments. A standard flat rate 902 has traditionally been offered to customers of the energy provider. This meant that regardless of the time of day, the customer would pay the standard flat rate 902 for any energy used. FIG. 9 also illustrates a ToU rate indicating a variable energy rate option for customers of the utility provider. A first portion of the energy rate 904 may be below that of the standard flat rate 902, indicating areas where customer savings can be realized compared to the standard flat rate 902. A second portion of the energy rate 906 may be at or near the standard flat rate 902, indicating areas where the customer savings would be neutral. Finally, a third portion of the energy rate 908 may be significantly higher than the standard flat rate 902, indicating areas where the customer would benefit by using less HVAC energy.

Generally, the utility provider will try to align the ToU rate offered to the customer with the actual cost of energy paid by the utility provider. Interval 910 indicates a time interval, most likely in the mid-to-late afternoon, during which the energy rate paid by the utility provider will be high. Note that the third portion of the energy rate 908 that is significantly higher than the standard flat rate 902 approximately aligns with the interval 910. Although not shown explicitly, some embodiments may also include intervals that are approximately aligned with the first portion of the energy rate 904 that may be below that of the standard rate 902, where the energy rate paid by the utility provider is lower.

One outstanding problem involves that fact that customers have no easy or automated way of changing their consumption pattern to adapt to rate changes through the course of a day, or from season to season, as these plans change). Utilities want to encourage more of their customers to adopt ToU rate plans because it more closely associates the rate to generate electricity with the rate the customer is paying. Key challenges of enabling adoption of these plans include helping customers (1) understand the implication of adopting a ToU rate plan, (2) adjust their consumption pattern to align with the customer's specific plan, and (3) manage energy usage within that persistent ToU rate plan, while automatically adapting to any short and long-term changes. In general, the problems with customers adopting a ToU rate can be summarized by the fact that the energy provider, the thermostat provider, and the customer are all separate entities, with little coordination between themselves. Even when a customer agrees to ToU pricing, the customer would then have to manually adjust their thermostat schedule in order to reduce energy consumption during high cost intervals, such as interval 910.

Figure 10:
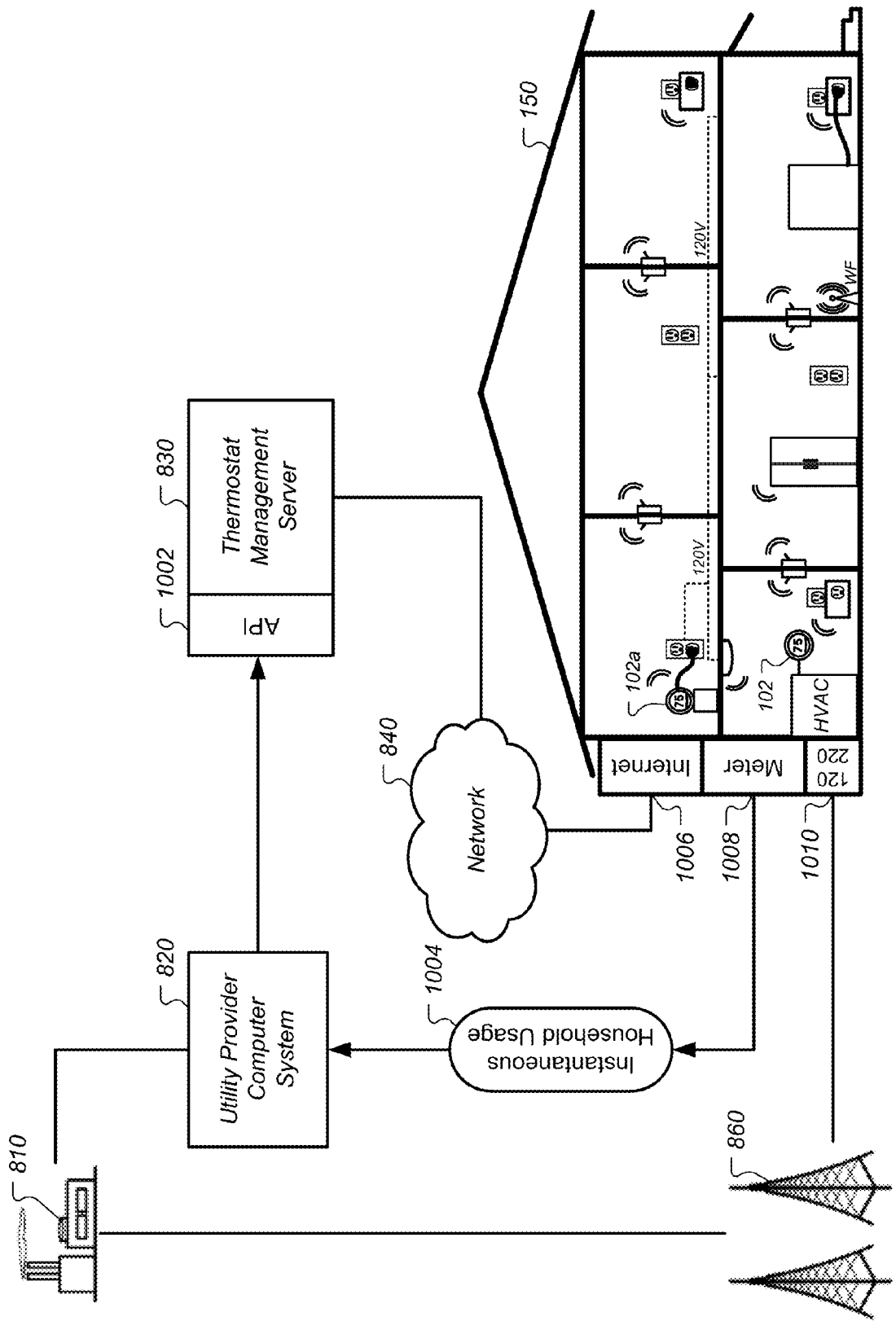
FIG. 10 illustrates an alternate arrangement of systems for implementing ToU pricing, according to some embodiments.

FIG. 10 illustrates an alternate arrangement of systems for implementing ToU pricing, according to some embodiments. A power generator 810 continues to provide energy to a power distribution network 860. This is generally transmitted to a structure 150 through an electrical panel 1010 that provides 120 VAC/220 VAC to the structure 150. While this embodiment describes transmission of electrical power, this is merely done by way of example and not meant to be limiting. Other embodiments may use a power generator 810 that provides a different type of utility, such as natural gas, and a power distribution network 860 specifically designed to transmit the different type of utility to the structure 150. For electrical power, various appliances throughout the structure 150, such as a refrigerator, a washing machine, and/or household electronics may consume electrical power. In the example of natural gas, appliances such as a dryer, a stove, and/or a fireplace may consume natural gas. The structure 150 may include an HVAC system that consumes electrical and/or natural gas power. It is important to note that the HVAC system will generally only constitute a portion of the overall energy usage for the structure 150 for each energy type.

The total energy usage for the structure 150 will generally be measured by one or more meters 1008, each of which will be dedicated to a particular energy type. By simply measuring the total energy usage per type for the structure 150 using the one or more meters 1008, it is generally impossible to accurately determine how much of the total energy consumption is attributable to the operation of the HVAC system. Instantaneous household energy usage 1004 can be transmitted from the meter 1008 to the utility provider computer system 820. Meters with this capability generally operate wirelessly or through a modem connection to the utility provider computer system 820. These meters 1008 may in some cases be referred to as "smart meters."

ToU rate plans are generally designed and maintained by the utility provider computer system 820. In some cases, each ToU rate plan may be comprised of one or more time intervals, each of the time intervals having an associated energy rate. In some cases, the time intervals may, in some embodiments, be dynamically changed by the utility provider in order to closely match a changing energy rate paid by the utility provider. Prior to this disclosure, customers had to know their approximate ToU schedule agreement with the utility provider, and take manual action with the thermostat in order to adjust their HVAC usage. Even though HVAC usage is just a single component of overall energy usage for the structure 150, heating and cooling of the structure 150 during the winter and summer months can be a predominant factor in overall structure energy usage. Therefore, adjusting the HVAC usage using the in-home thermostat remains an important part of reducing energy consumption during high-rate ToU intervals. In other cases, the utility provider could communicate high-cost and low-cost ToU intervals to the structure 150. However, this still required users to look at an email, push message, or other notification, then manually adjust their thermostat to reduce energy usage at the correct time. In some cases, the utility provider was a separate entity from the provider of the thermostat, and there was no direct way for a digital representation of the ToU intervals, rates, and/or thresholds to be transmitted directly to an intelligent thermostat. Furthermore, no existing thermostats were able to automatically adjust a setpoint schedule based on real-time ToU information. In other words, there was a technology problem that prevented the efficient implementation of ToU plans in modern, intelligent thermostats.

In some embodiments described herein, the term "utility provider" may refer specifically to an entity responsible for installing utility equipment at a structure. In one example, the utility provider may refer specifically to a solar power company. In some embodiments, a solar power company may install and lease solar panels to a structure. The owner of the structure may be obligated to receive energy from the solar panels and/or the solar power company. In exchange, the solar power company may sell excess energy generated by the solar panels to another utility provider with an energy grid. The algorithms described herein for operating a thermostat and/or thermostat management server may be particularly advantageous for embodiments involving a solar power company, because reducing energy usage during high-cost intervals means that there is more energy for the solar power company to sell to another utility provider. Therefore, in FIG. 10, the "utility provider" may include a plurality of different entities, including a solar panel company, a traditional power company that operates the power generator 810 and power distribution network 860, and so forth.

The embodiments described herein overcome this technology problem by providing a unique communication interface between the utility provider computer system 820 and the thermostat management server 830. A custom API 1002 is designed for the thermostat management server 830 to receive real-time information for the ToU plan agreements between the utility provider and the customer. As will be described in greater detail below, the utility provider 820 can use the custom API 1002 to define one or more rate plans, and dynamically adjust intervals and rates within each of the one or more rate plans. In turn, the thermostat management server 830 can receive the time intervals for each rate plan from the utility provider computer system 820, and store those intervals in a plurality of synchronization buckets. The synchronization buckets at the thermostat management server 830 are associated with a particular user account tied to an intelligent thermostat installed in the structure 150. Periodically, such as every 15 minutes, the thermostat management server 830 can synchronize the synchronization buckets in the user account at the thermostat management server 830 with corresponding synchronization buckets on the individual thermostats. This communication can be performed through a network 840, such as the Internet, where the intelligent thermostat is accessible through a home Internet router. After receiving the ToU interval information from the synchronization buckets, the intelligent thermostat can alter its learning algorithm to adjust to the ToU intervals. The specific algorithms will be described in greater detail below.

Although not shown explicitly in FIG. 10, some embodiments may also provide direct access to the meters 1008 by the thermostat itself. In these embodiments, direct communication between the thermostat and the meters 1008 may bypass the communication through the utility provider computer system 820, the API 1002, and/or the thermostat management server 830.

Figure 11:
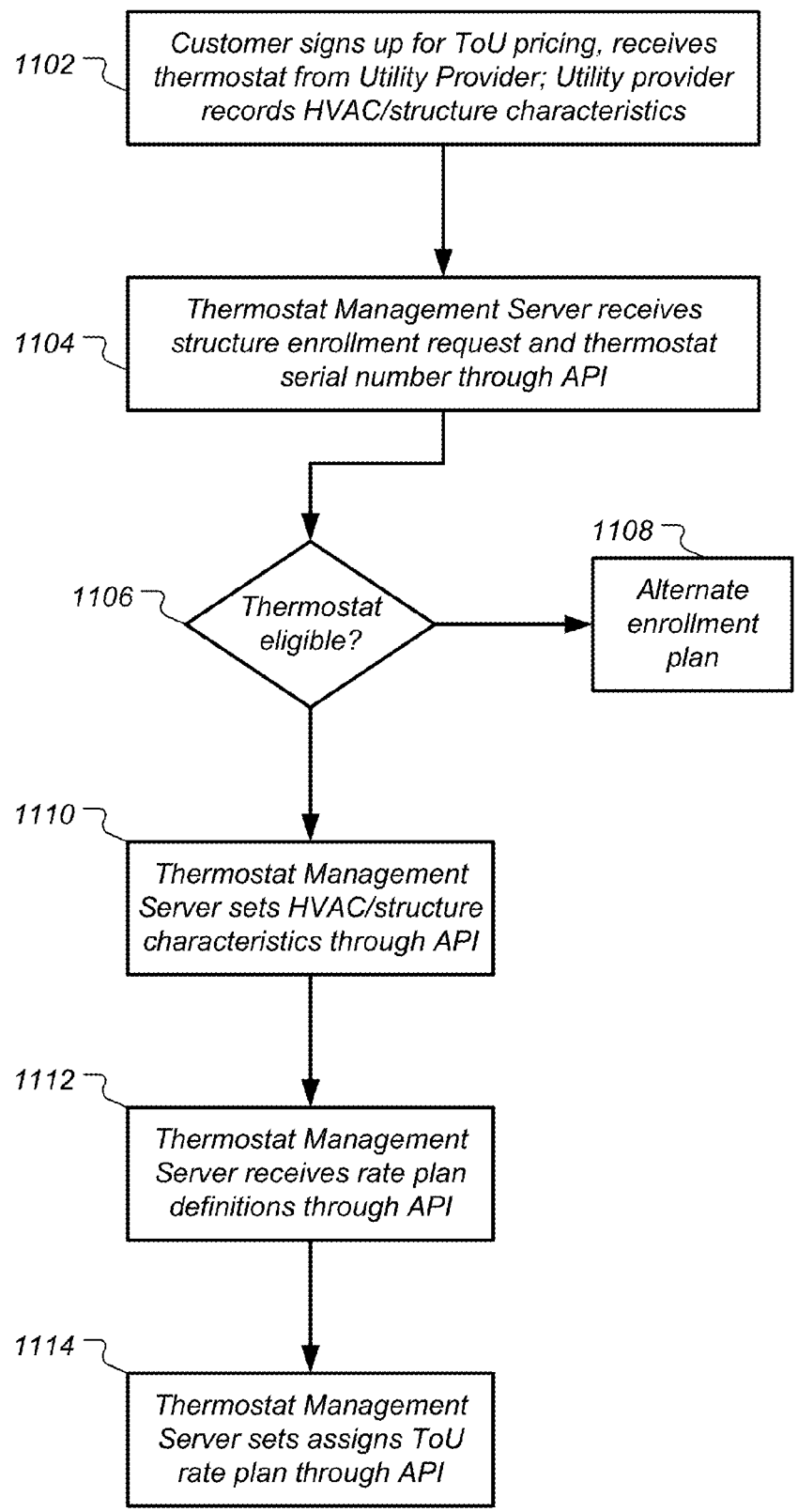
FIG. 11 illustrates a flowchart of a method for enrolling a customer in a ToU plan associated with an intelligent thermostat, according to some embodiments.

In some embodiments, the process may begin with a customer signing up for a ToU plan. Typically, coordinating the sign-up process between the utility provider, the thermostat provider, and the customer was a difficult process. FIG. 11 illustrates a flowchart of a method for enrolling a customer in a ToU plan associated with an intelligent thermostat, according to some embodiments. The method may include providing a thermostat at or near the time that the customer signs up for a ToU rate plan (1102). In one embodiment, the utility provider may include a solar panel installation company. During installation of solar panels, the utility company may also install an intelligent thermostat. The thermostat may be provided in a batch of thermostats from the thermostat provider to the utility provider as part of a promotion. In order to entice customers to sign up for the ToU rate plan, the utility provider may offer the intelligent thermostat for free or for a greatly reduced price. The utility provider can record the serial number of the thermostat along with a particular ToU rate plan that the customer agrees to. In other examples where on-site installation is not necessarily required at the structure, the utility provider can ship an intelligent thermostat to the customer when signing up for a ToU plan. For example, a customer can log into a utility provider's website, agree to the terms and conditions of the ToU rate plan, and afterwards the utility provider can ship the intelligent thermostat to the customer.

The method may also include using the custom API of the thermostat management server to inform the thermostat management server that the customer has enrolled in the ToU rate plan and has a qualifying thermostat (1104). As will be described in greater detail below, the custom API may include functions that allow a utility provider computer system to identify a thermostat by serial number and indicate a selected ToU rate plan for that thermostat. Prior to enrolling the thermostat in the rate plan, the utility provider can also define rate plans and define/adjust time intervals, rates, and thresholds for those rate plans through the API. After the thermostat is installed and the ToU rate plan adjustments have been enabled on the thermostat, the utility provider computer system can dynamically update the time intervals for the rate plan, or switch the thermostat from an existing rate plan to a different rate plan in real-time through the API.

The method may also determine whether the thermostat is eligible for ToU plan enrollment (1106). For example, the thermostat provider will typically record a list of serial numbers of thermostats provided to the utility provider. This step can check the serial number submitted through the custom API to the thermostat management server against the recorded list of eligible thermostat serial numbers. This can serve to effectively limit the number of thermostats that can be provided at free or discounted prices by the utility provider. In cases where the serial number does not match an eligible serial number, an alternative enrollment plan can be provided (1108). For example, the thermostat provider can disregard the eligibility and enroll the thermostat in the ToU rate plan indicated by the utility provider. The thermostat provider can then require payment for the thermostat from the utility provider. Alternatively, an error message can be transmitted to the thermostat indicating that the thermostat has not been enabled for automatic ToU operations.

In cases where the thermostat is eligible, the thermostat management server can receive HVAC and/or structural characteristics through the API (1110). In some embodiments, the installation process by the utility provider can include a characterization of the structural and/or HVAC characteristics of the home. For example, the utility provider can estimate the square footage of the home, the thermal insulation of the home, the wattage of the HVAC system, the fuel type of the HVAC system, and so forth, in order to derive one or more HVAC characteristics and/or one or more structural characteristics for the home. This information can be used by the thermostat during the adjustment algorithm described in detail below.

The method may additionally include receiving one or more rate plan definitions through the API (1112). Example formats for receiving rate plan definitions through the API will be described in greater detail below. Finally, the thermostat management server may receive a selection of a particular ToU rate plan through the API for the enrolled thermostat (1114). After receiving this information, the thermostat management server has enough information to activate the ToU adjustment feature on the thermostat as will be described in greater detail below.

FIGS. 12A-12B illustrate interface definitions for the API provided to the utility provider by the thermostat management server that can be used to enroll structures and defined ToU rate plans, according to some embodiments. In this particular embodiment, the API interface may be categorized as a RESTful interface, which would be well understood by those having skill in the art. Function 1202 can be used to enroll (POST) a structure in a particular ToU rate program using a particular device. For example, in the example described above, the utility provider may provide a thermostat to the customer during installation when/if the terms and conditions of the ToU rate plan are accepted. Function 1202 can accept a program instance identifier for a particular energy partner (e.g., a particular utility provider) to identify the ToU program. Function 1202 can also accept a unique identifier for the thermostat, such as the thermostat serial number, and the time at which the ToU rate plan was accepted. Function 1202 can then return a structure ID that uniquely identifies the enrolled structure for the utility provider. The structure ID can be used by other API function calls described below to reference an existing enrollment.

Function 1204 can be used to unenroll (DELETE) a structure in a ToU program. By providing the structure ID received during the enrollment process using function 1202, function 1204 can remove the structure from the ToU rate plan.

Function 1206 can be used to assign (PUT) a specific rate plan to enroll a structure. The utility provider can reference an existing structure ID and assign a rate plan ID and an activation time. The rate plan ID can identify a specific ToU rate plan provided by the utility provider. In some embodiments, the utility provider may provide energy for large geographic regions. Different areas within the geographic region may have different time intervals corresponding to different energy prices that are available locally. Therefore, a single utility provider may have a plurality of different ToU rate plans that are available based on customer preference and/or geographic location. Function 1206 can be used to select among the available rate plans that have been defined by the utility provider, and to assign the selected rate plan to the indicated structure ID. After a particular rate plan has been assigned using function 1206, function 1208 can be used to get (GET) the assigned ToU rate plan for the indicated structure. Using the structure ID, the utility provider can receive the rate plan ID identifying the particular ToU rate plan for which the structure is currently assigned.

Function 1210 allows the utility provider to set (PUT) HVAC capacities for a thermostat. As described above, the utility provider may include an HVAC assessment as part of their installation process. They can estimate the wattage of the HVAC system, the square footage of the house, the insulation properties, and so forth, in order to help the thermostat accurately predict the amount by which the temperature setpoints need to change in order to realize a threshold amount of energy savings. Function 1210 can use the device ID to identify the thermostat, assign the thermostat to a particular structure ID, and use the device serial number to assign a cooling capacity, a capacity of a primary heating method, a capacity of a secondary heating method, a fan efficiency, and/or the like, for the HVAC system.

The interface definitions illustrated by FIGS. 12A-12B can be used by the utility provider to GET/POST/PUT/DELETE information associated with the initial enrollment of a device/structure in a ToU rate plan. FIGS. 13A-13B illustrate interface definitions for the API provided to the utility provider by the thermostat management server that can be used to define, maintain, and/or update definitions of the rate plans assigned to various structures, according to some embodiments.

Function 1302 can be used to create (POST) an initial definition of a ToU rate plan. The utility provider can provide a name and description of the new ToU rate plan, along with an array of intervals. Each interval may include a start time and an end time for the interval. The interval may also include a cost, comprising a threshold (or multiplier) and a rate price associated with the interval. In some embodiments, the array of intervals provided by function 1302 may be required to be contiguous, such that the end time of one interval must be aligned with the start time of the next interval. After the definition of the ToU rate plan is received, the rate plan ID can be returned to the utility provider computer system. Recall above, that when enrolling a structure, this rate plan ID can be used by function 1206 to assign the rate plan to the structure.

Function 1304 can be used to return (GET) the definition of an existing rate plan. By providing the rate plan ID, function 1304 can return the name and description of the indicated rate plan, along with information associated with the time intervals. Function 1306 can be used to update (PUT) a rate plan, while function 1308 can be used to delete a rate plan, both of which are referenced by the rate plan ID returned when the rate plan was created by function 1302. Function 1310 can return (GET) a list of rate plans defined by the utility provider. For each rate plan, function 1310 can return the rate plan ID, the name, description, and information associated with the time intervals.

Function 1312 can be used to add (POST) time intervals to an existing rate plan. Using the rate plan ID, the utility provider can upload a new set of time intervals, each interval definition comprising a start time, and end time, and a cost in terms of a threshold/multiplier and a price for each interval. Function 1314 can be used to clear (DELETE) the time intervals in an existing rate plan. The utility provider can provide an "after time," after which any interval definitions in the existing rate plan will be deleted. Function 1314 can be used in conjunction with function 1312 to delete existing intervals, and then add replacement intervals. Finally, function 1316 can be used to return (GET) all the intervals associated with a particular rate plan. By providing the rate plan ID, the utility provider can receive all of the intervals that occurred between a designated start time and end time.

It will be understood that these API function definitions are merely examples, and are not meant to be limiting. These function definitions have been specifically designed for a ToU rate plan that is administered by a utility provider that is separate from the thermostat provider. Importantly, these API functions provide the necessary link between the utility provider and the thermostat management server necessary for the thermostat management server to instruct the intelligent thermostat to automatically make adjustments to a user schedule to accommodate ToU rate plans. This API provides a technology solution and communication link between these two computer systems that was missing prior to this disclosure.

Figure 14:
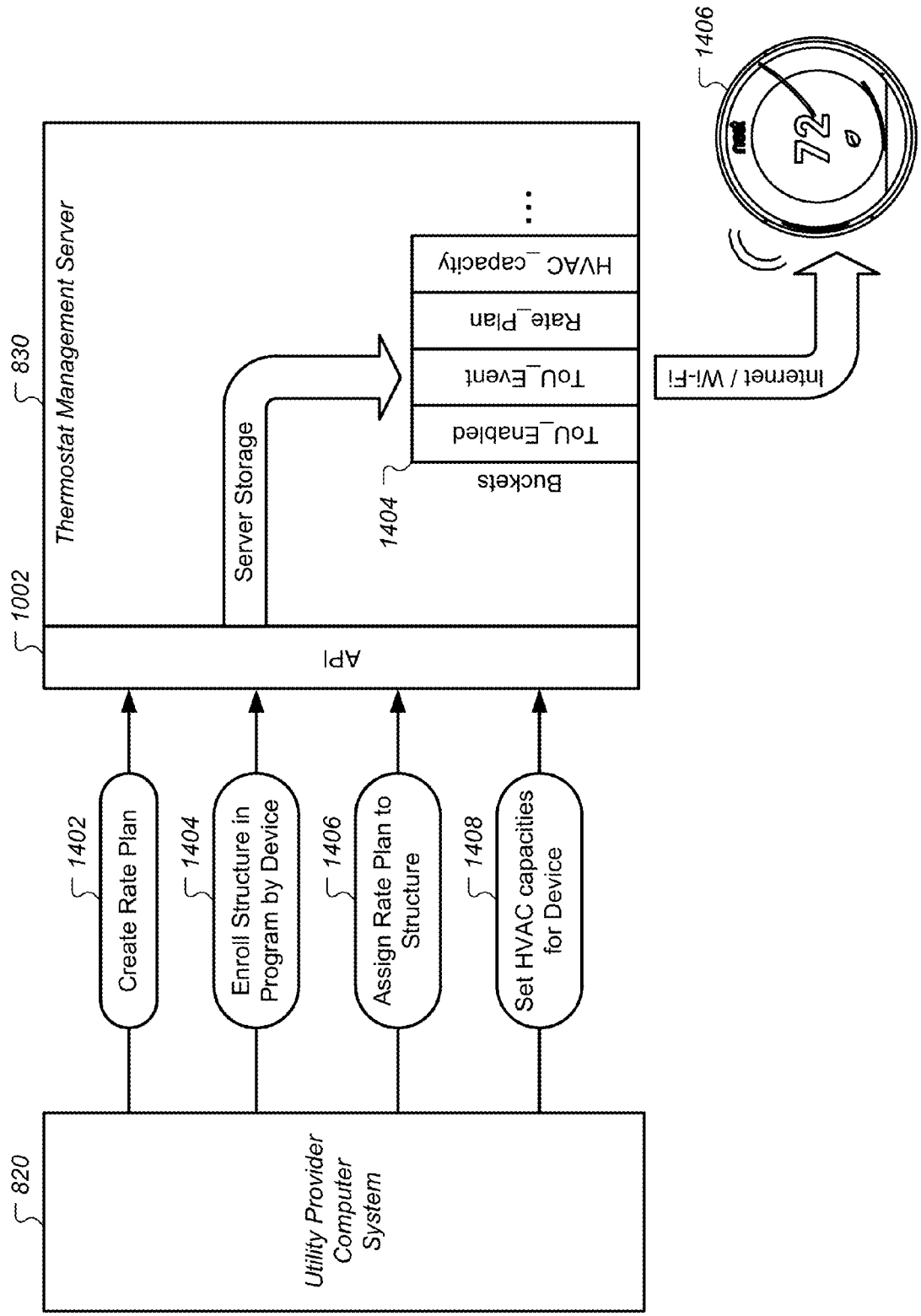
FIG. 14 illustrates a block diagram of how information is received through the API of the thermostat management server and stored in synchronization buckets for transmission to the thermostat, according to some embodiments.

FIG. 14 illustrates a block diagram of how information is received through the API of the thermostat management server and stored in synchronization buckets for transmission to the thermostat, according to some embodiments. As described above in relation to FIG. 11, the initial sign-up process for a ToU rate plan may include providing, by the utility provider computer system 820, a rate plan definition (1402), an instruction to enroll a structure in the ToU program using the thermostat serial number (1404) an assignment of the structure to a particular rate plan (1406), and setting the HVAC capacities for the thermostat (1408). Each of these assignments may be made through the custom API 1002 described above.

The thermostat management server 830 can include a customer account database that stores the serial number of the thermostat, the structure ID, the rate plan ID, and/or any other information provided by the utility provider computer system 820. Each user account may also include user account information used specifically by the thermostat management server 830 to interact with the thermostat 1406. This may include MAC/IP addresses for the thermostat, and information recorded by the thermostat 1406, such as user schedules, occupancy information, temperature profiles, and so forth.

In order to simplify transmissions between the thermostat management server 830 and the thermostat 1406, information may be stored in a plurality of synchronization buckets 1404. The synchronization buckets 1404 may include a plurality of memory locations that are synchronized between the thermostat management server 830 and corresponding memory locations in a memory device of the thermostat 1406. Periodically, the thermostat 1406 may connect with the thermostat management server 1830 through the Internet or other available network to synchronize the synchronization buckets. New information provided by the thermostat management server 1830 can be downloaded to corresponding synchronization buckets on thermostat 1406, while new information recorded by the thermostat 1406 can be uploaded to corresponding synchronization buckets 1404 at the thermostat management server 830.

In some embodiments, the synchronization buckets 1404 may include a Boolean value indicating whether the ToU feature is enabled for the thermostat 1406, a ToU event indicator, the HVAC capacity, and/or a rate plan definition. The rate plan definition may simply include the start/stop time for each interval and the associated thresholds/costs. It will be understood that many other synchronization buckets may also be present at the thermostat management server that are not explicitly shown in FIG. 14.

FIG. 15 illustrates a JSON representation of data stored in two of the significant synchronization buckets 1404. Specifically, the ToU bucket 1502 is depicted, which illustrates various values used to initialize enrollment into the ToU program. Similarly, the rate plan bucket 1504 is depicted, which illustrates various values used to define a specific ToU rate plan. For example, the rate plan bucket 1504 includes a version, a utility name, a description, an ID, and a plurality of intervals. Each interval includes a start time and an end time, along with a threshold rate per kilowatt hour and a cost multiplier. For example, a cost multiplier of 1.00 indicates that the user's standard utility rate applies during that time interval. A cost multiplier of 2.301 indicates that the user's standard utility rate would be multiplied by 2.301 during that particular time interval. The information in these buckets 1502, 1504 can be synchronized to corresponding synchronization buckets at the thermostat with each update.

Figure 16:
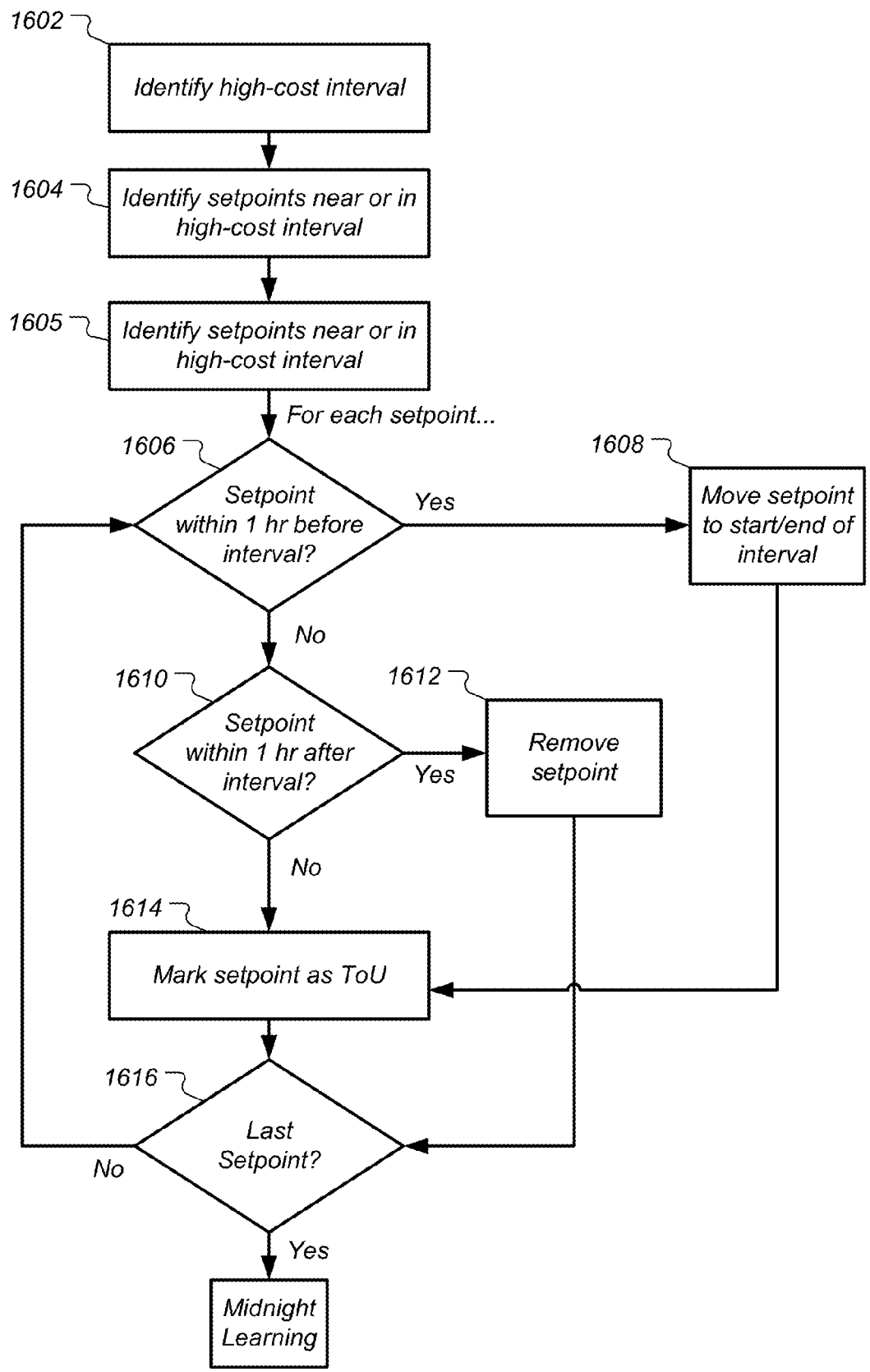
FIG. 16 illustrates a method for identifying and initializing setpoints that are affected by the ToU plan, according to some embodiments.

After synchronizing the buckets containing the ToU plan information with the thermostat, the thermostat itself can integrate the ToU intervals into its learning algorithm. First, the thermostat can identify, delete, and/or add setpoint temperatures that would be affected by the ToU intervals. FIG. 16 illustrates a method for identifying and initializing setpoints that are affected by the ToU plan, according to some embodiments. The method may include identifying a high-cost interval in the plurality of intervals transmitted as part of the ToU rate plan (1602). In some embodiments, only the highest cost interval out of the plurality of intervals may be considered. In other embodiments, each time interval with a cost multiplier that is not 0.00 may be considered in turn by the method of FIG. 16. The high-cost interval may be distinguished from other intervals wherein the energy rate is lower. The energy rate may refer specifically to a cost per kilowatt hour charged to a customer the high-cost interval may be referred to as a "first interval," while the another time interval outside of the first interval where the energy rate is lower may be referred to as a "second interval."

The method may also include identifying any setpoints near or within the identified high-cost interval (1604). This may include setpoints that occur inside the identified high-cost interval. This may also include setpoints that occur within a threshold amount of time either before or after the identified high-cost interval. For example, a threshold of one hour may be used, whereby any setpoint occurring within one hour prior to the high-cost interval and any setpoint occurring within one hour after the high-cost interval would be identified. The method may next add new setpoints to the start and end of the interval if they do not already exist (1605). Then, the method may identify setpoints that occur within one hour before the beginning or end of the interval (1606). For example, if there is already a setpoint less than one hour before the beginning of the interval, that setpoint will be moved to the beginning of the interval (1608). The setpoint added in step 1605 may be modified to use the same temperature value of the moved temperature setpoint in step 1606. Similarly, if there is already a setpoint less than one hour before the end of the interval, that setpoint will be moved to the end of the interval (1608).

The method may also include identifying setpoints that occur within one hour after the start or end of the interval (1610). For example, if there is already a setpoint less than one hour after the beginning of the interval, that setpoint will be removed (1612). Similarly, if there is already a setpoint less than one hour after the end of the interval, that setpoint may also be removed (1612). If the setpoint occurs within the interval, it will be marked as a "ToU setpoint" for the learning algorithm described below. Each setpoint that has been identified as being near the high-cost interval can be processed using steps 1606-1614 until the last setpoint is evaluated (1616).

The methods FIG. 16 can be initiated when a user resets the learning algorithm of the thermostat or clears the setpoint schedule. This method can also be initiated when the synchronized buckets indicate that the rate plan intervals have changed. The method can also be initiated if the user changes fuel types such that a previously supported mode is no longer supported. For example, on a single-stage heating system, the stage-one heating fuel type may be initially set to electric, and then subsequently be change to gas, which would require adjustments to the ToU schedule.

In some embodiments, for the first seven days after a ToU event, a learning algorithm will gradually adjust all the setpoints identified by the algorithm of the FIG. 16 in an efficient direction. The learning algorithm can be run, for example, daily to account for changes made to the setpoint schedule by users within the last 24 hours. For example, the learning algorithm may run daily at midnight. If the user adjusts a ToU setpoint identified above, the setpoint will no longer be marked as "ToU setpoint" and will no longer be adjusted by the ToU algorithm. If the user adds a setpoint during an identified high-cost interval after the adjustments made above, that setpoint will not be automatically adjusted by the algorithm. Additionally, if the user performs manual setpoint adjustments during the high-cost interval, the learning algorithm of the thermostat will be allowed to add new setpoints at this time, but need not adjust other ToU setpoints.

Figure 17:
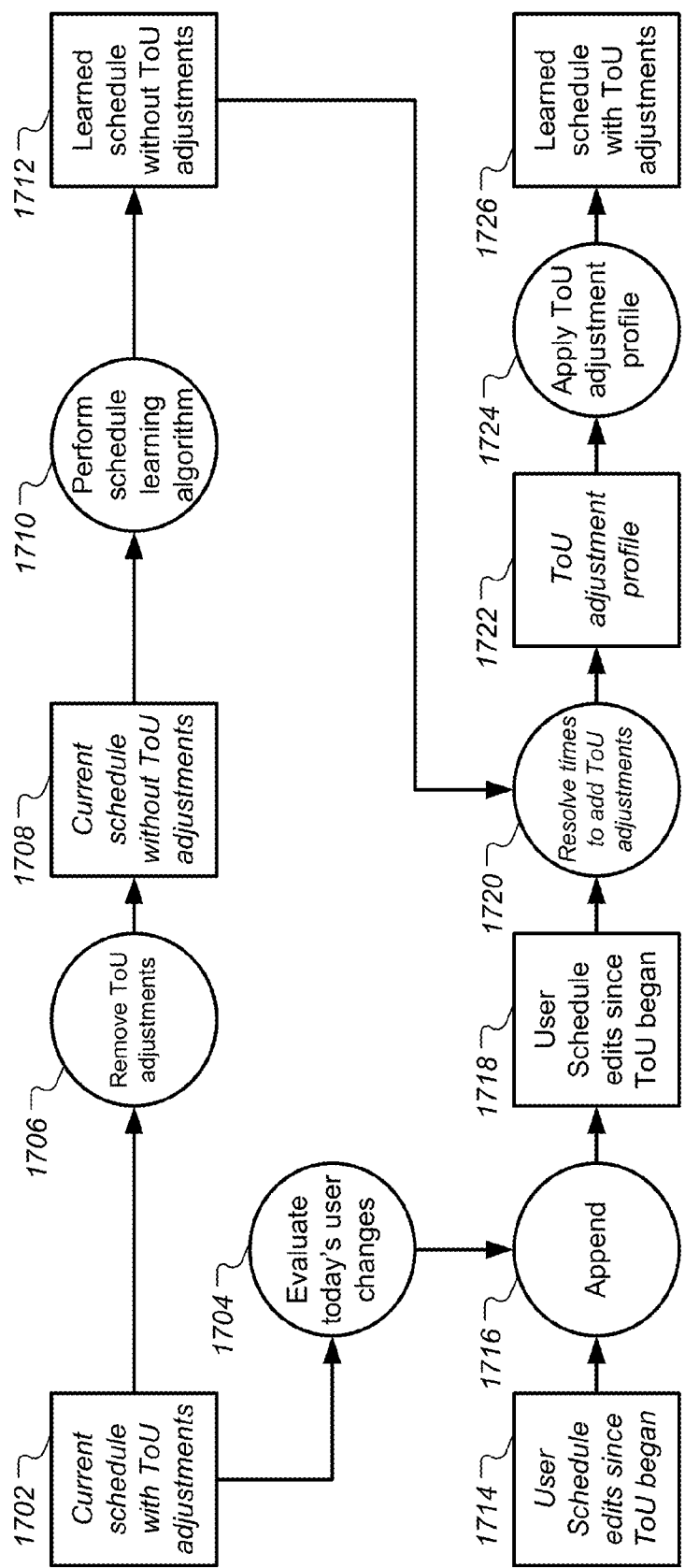
FIG. 17 illustrates a data flow diagram for a learning algorithm of the intelligent thermostat that incorporates the ToU setpoint identified by the method of FIG. 16, according to some embodiments.
Figure 18B:
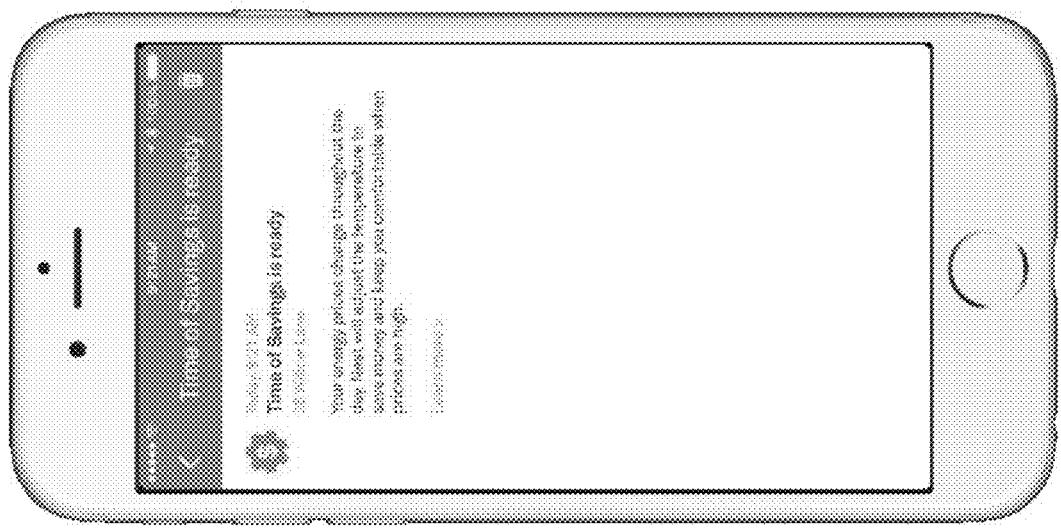
FIG. 18B illustrates a user interface that can be displayed on a mobile device, according to some embodiments.
Figure 18A:
FIG. 18A illustrates a user interface of the learning thermostat, according to some embodiments.

FIG. 17 illustrates a data flow diagram for a learning algorithm of the intelligent thermostat that incorporates the ToU setpoint identified by the method of FIG. 16, according to some embodiments. The process begins with two separate inputs: the current setpoint schedule with ToU adjustments (1702), and the user schedule including user edits since the ToU event began (1714). Using the current schedule with ToU adjustments, the method will evaluate all user commands from the current day that included schedule edits (1704), and then save the times that the user modified or added setpoints. These times can be added to a running set of modifiable times since the current ToU event began. The ToU will not add or just any setpoints to these times because they have been modified affirmatively by a user.

The same input that can be used to adjust all ToU setpoints such that the schedule represents the most likely user schedule at this point if the ToU adjustment had not been active (1706). This schedule (1708) can be printed to event logs within the thermostat. Next, the thermostat can initiate the learning algorithm using the current schedule without the ToU adjustments (1710). The output can be a learned schedule that represents the user's most likely preferred schedule if the ToU function had not been offered (1712).

The bottom half of FIG. 17 may be to be used to incorporate the ToU adjustments into the learned schedule. The day's user changes can be appended to the user schedule of setpoints added since the ToU began (1716). This results in a user schedule that includes edits since the ToU began with the ToU adjustments (1718). Next, the method can resolve times to add to the ToU adjustments (1720). For example, the method can evaluate the next week's worth of peak-cost intervals in the current ToU rate plan and determine which at which setpoint times to add ToU adjustments. Additionally, several setpoint changes can be performed. Start setpoints can be added to the beginning of each interval unless the user has performed schedule edits at that time as described above. Setpoint temperatures during the ToU interval can be converted to ToU setpoints, unless the setpoint has been edited by the user any time after the ToU adjustments began. Note that learned setpoints will be converted to ToU setpoints, even if they were learned after the adjustments began. Finally, recovery setpoints can be added at the end of each ToU interval, unless the user has performed schedule edits (additions and/or deletions) at that time. The result of this operation a the ToU adjustment profile (1722) that uses the learned schedule generated by the learning algorithm and incorporates the automatic ToU adjustments. Next, the method can apply the ToU adjustment profile to the active schedule (1724). This may include adjusting all ToU setpoints that are not recovery setpoints to yield a schedule that represents the user's preference as well as the ToU adjustments during the ToU interval. Generally, setpoints during the ToU interval can be lowered by 0.25° F., 0.5° F., 1.0° F., 1.5° F., 2.0° F., 2.5° F., 3.0° F., 4.0° F., 5.0° F., and/or the like, depending on a comfort factor as indicated by the preferences of the user and/or the particular embodiment.

In some embodiments, a dynamic preconditioning interval may precede the ToU time interval in order to move energy out of the high-cost ToU interval. In some embodiments, the dynamic preconditioning interval may condition the structure to preserve a user's temperature preferences throughout the ToU interval while limiting HVAC runtime during the high-cost TOU interval. In some embodiments, a setpoint at the beginning of the ToU interval may be required, and the preconditioning time may be limited to a predetermined threshold, such as one hour. In some embodiments, the preconditioning target is a temperature 1° F. less efficient (or more energetic) than the upcoming setpoint that begins the ToU event. For example, if the device is in a heating mode, and the upcoming setpoint is 68.0° F., the preconditioning would target a 69° F. setpoint. When the setpoint at the beginning of the ToU interval becomes current, the preconditioning will stop, and the target temperature will revert to the scheduled setpoint.

FIGS. 18-23 illustrate various user interfaces that can be provided on the thermostat and/or a mobile computing device to activate, interact with, and evaluate a ToU function. FIG. 18A illustrates a user interface of the Nest Learning Thermostat described above. After installing the thermostat and downloading the synchronization buckets from the thermostat management server indicating a particular ToU plan, the thermostat can inform the customer that the ToU operation will be in effect. In some embodiments, the ToU operations are represented to the customer as a "Time of Savings" feature. This user interface can be used to inform the user that the thermostat will automatically adjust setpoints in order to save money when energy prices are high during a ToU event and high-cost interval. Additional information can be provided to a user through the "More Info" menu item. FIG. 18B illustrates a similar user interface that can be displayed on a smart phone or mobile device. As described above, the Nest Learning Thermostat described above may be connected via one or more wireless networks to an app operating on a customer's smart phone device. Not only is the customer able to view the status of the thermostat and control the temperature, but the customer is also able to activate features such as the ToU feature described herein.

Figure 19:
FIG. 19 illustrates an embodiment of a thermostat in what is referred to as a "Farsight" mode, according to some embodiments.

In some embodiments, it may be desirable to keep the user informed in real time as the ToU adjustments to the schedule are in effect. FIG. 19 illustrates an embodiment of a thermostat in what is referred to as a "Farsight" mode, according to one embodiment. In this mode, the thermostat has not detected a user approaching the thermostat with an intent to interact with the user interface of the thermostat. Therefore, the user interface can display a larger icon or message that can be read from a great distance. In this embodiment, a ToU icon can be used to indicate that the thermostat is currently operating in a high-cost ToU interval, and that the thermostat has automatically adjusted temperature setpoints during the high-cost interval in order to save money.

Figure 20B:
FIG. 20B illustrates a user interface displayed on a mobile device display, according to some embodiments.
Figure 20A:
FIG. 20A illustrates a user interface of a thermostat in an active mode while the ToU function is operative, according to some embodiments.

FIG. 20A illustrates a user interface of a thermostat in an active mode while the ToU function is operative, according to some embodiments. The features of the depicted user interface, such as the "cooling" indicator, the current temperature, and the target temperature with the dial around the exterior of the interface, are all existing features of the thermostat. These features may be displayed when a user approaches the thermostat with an intent to interact with the user interface. When the ToU function is active, the "Time of Savings" text can be displayed with the ToU icon from the Farsight interface described above. This serves to indicate to the user that the ToU function is active, and that any adjustment of the setpoints will disrupt the cost savings that would otherwise be realized by the ToU function. FIG. 20B illustrates a similar user interface displayed on a mobile device display.

Figure 21B:
FIG. 21B illustrates a user interface displaying an interactive timeline of temperature setpoints and ToU intervals, according to some embodiments.
Figure 21A:
FIG. 21A illustrates a user interface that may be displayed when a user attempts to adjust the temperature setting while the ToU function is active, according to some embodiments.
Figure 22:
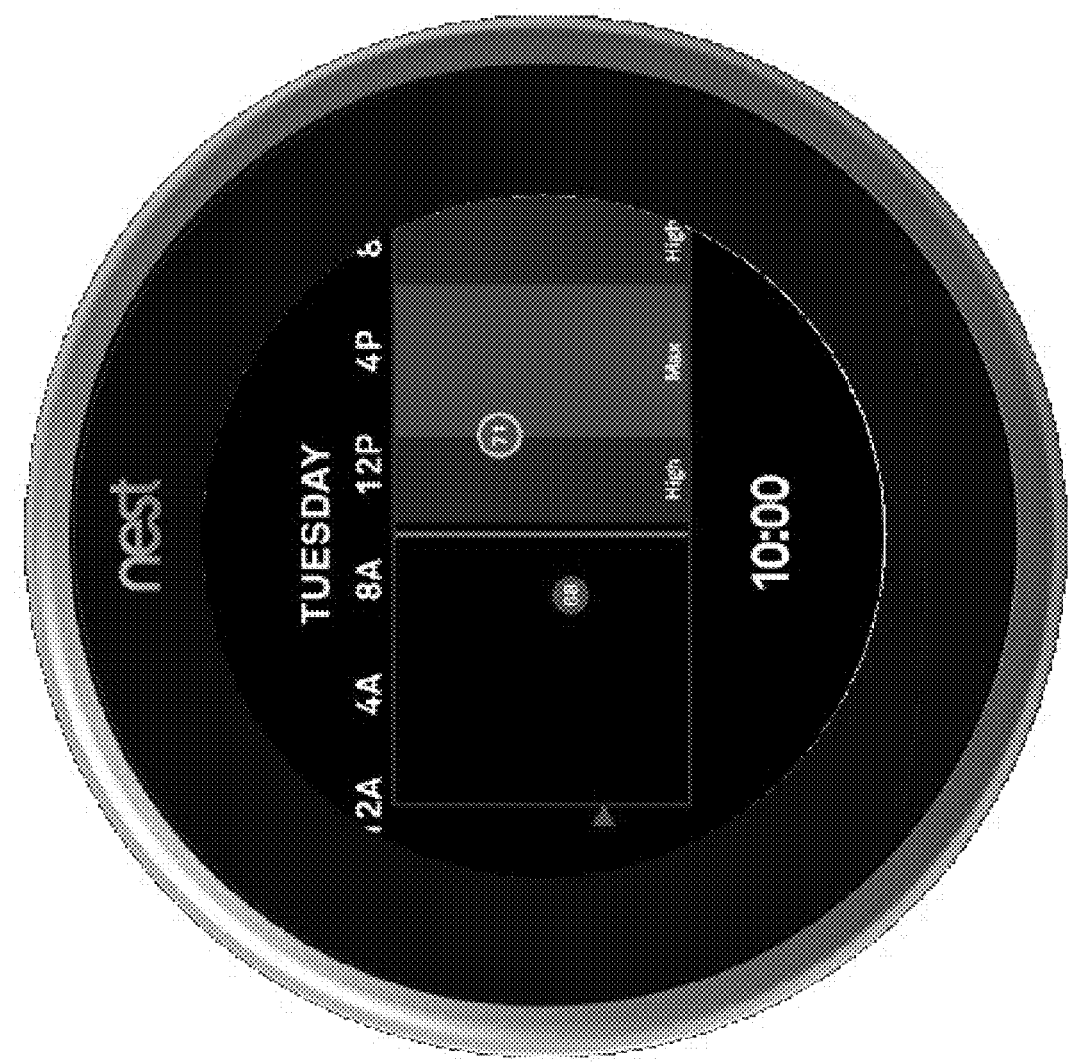
FIG. 22 illustrates a user interface displaying an interactive timeline of temperature setpoints and ToU intervals, according to some embodiments.

FIG. 21A illustrates a user interface that may be displayed when a user attempts to adjust the temperature setting while the ToU function is active, according to some embodiments. This user interface may be referred to as a "speedbump" that forces the user to consider the ramifications of a temperature adjustment. If the user continues to adjust the temperature after the speedbump, the ToU feature can be turned off. FIG. 21B illustrates a user interface that may be displayed when the ToU function is available but not active. In this user interface, the "Time of Savings" text indicator may still be displayed, thereby indicating that the ToU function is available and that the ToU rate is currently in a high-cost interval. However, the ToU icon may be removed indicating that the ToU function is not currently operating due to the user temperature adjustments.

FIG. 22B illustrates a user interface displaying an interactive timeline of temperature setpoints and ToU intervals, according to some embodiments. The first temperature setpoint does not have a border, indicating that this is a regularly scheduled setpoint. The second temperature setpoint occurring in the beginning of the high-cost ToU interval has an added border, indicating that this is a "ToU setpoint" that has been either added or modified by the ToU function. FIG. 22B also shows a horizontal timeline, where different ToU intervals are highlighted on the display. In this embodiment, a max-cost interval is surrounded by two high-cost intervals, which are surrounded by a standard interval. Different colors, shadings, and/or other graphical indicators can be used to distinguish one interval from the other.

Figure 23:
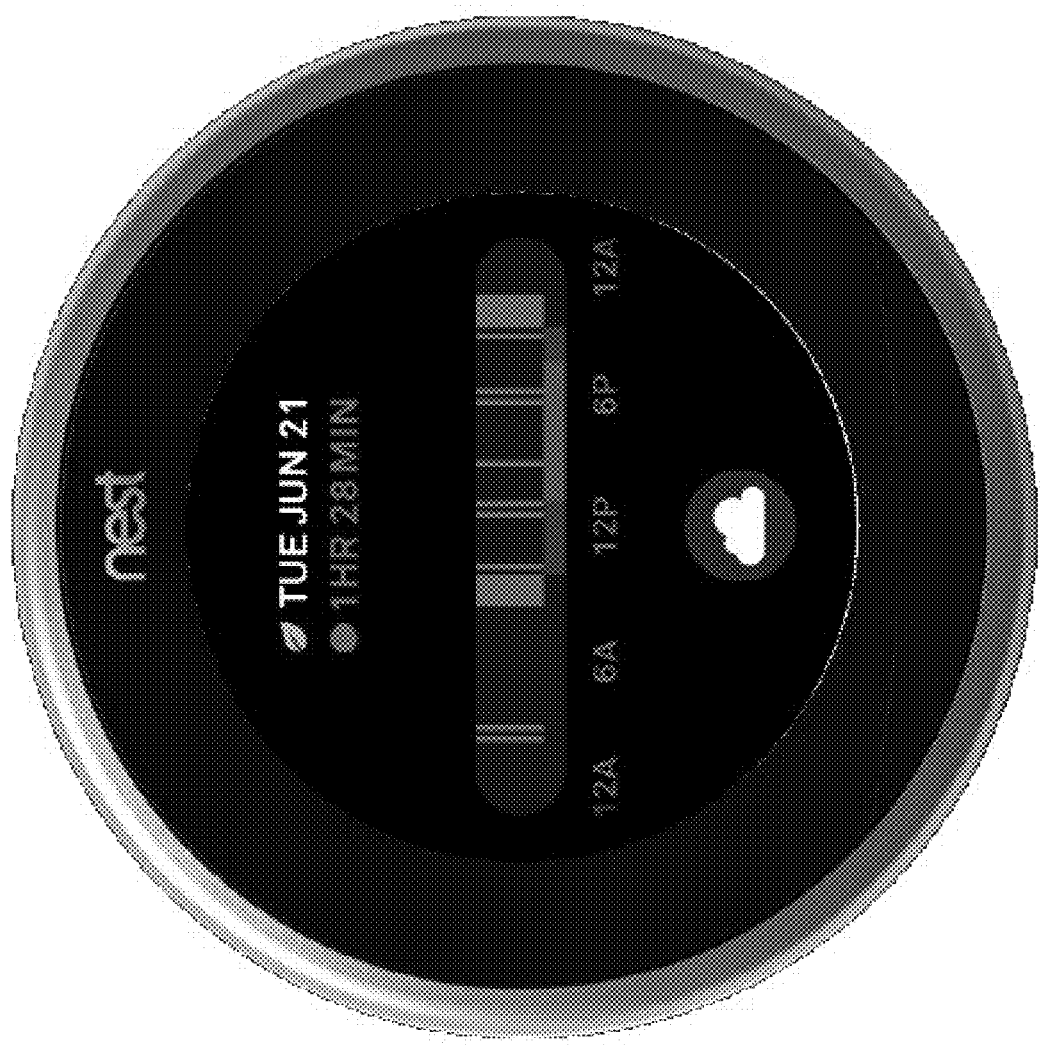
FIG. 23 illustrates a user interface that displays time intervals where the HVAC system is operative compared to time intervals where the ToU pricing was relatively high, according to some embodiments.

FIG. 23 illustrates a user interface that displays time intervals where the HVAC system is operative compared to time intervals where the ToU pricing was relatively high. The top portion of the user interface displays vertical bars that indicate when the air conditioner and/or heating function of the HVAC system is active. The bottom portion of the user interface displays time intervals that use colors, shading, and/or texture to distinguish ToU intervals. As shown in FIG. 23, there is a longer preconditioning period in the hour before the ToU intervals begin, and a similar post-conditioning period in the hour after the ToU intervals end.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the present teachings.

What is claimed is:

1. A thermostat comprising:
   a housing;
   one or more memory devices comprising a stored setpoint schedule, wherein the stored setpoint schedule comprises a plurality of setpoints;
   one or more temperature sensors, each of the one or more temperature sensors being configured to provide temperature sensor measurements;
   a processing system disposed within the housing, the processing system being configured to be in operative communication with the one or more temperature sensors to receive the temperature sensor measurements, in operative communication with the one or more memory devices to determine a setpoint temperature, and in still further operative communication with a heating, ventilation, and air conditioning (HVAC) system to control the HVAC system based at least in part on the setpoint temperature and the temperature sensor measurements;
   wherein the processing system is programmed or configured to control the HVAC system by performing operations comprising:
   receiving an indication of a first time interval, wherein energy is available to the HVAC system at a first rate during the first time interval, energy is available to the HVAC system at a second rate during a second time interval that is outside of the first time interval, and the first rate is higher than the second rate;
   identifying or adding one or more setpoints in the plurality of setpoints of the stored setpoint schedule that occur in, or within a threshold time of, the first time interval;
   adjusting or setting the one or more setpoints to reduce energy usage during the first time interval;
   receiving user changes to the operation of the thermostat during the first time interval;
   executing a learning algorithm to update the stored setpoint schedule to be used in future occurrences of the first time interval by combining:
   (i) the one or more setpoints that were adjusted to reduce energy usage during the first time interval; and
   (ii) the user changes to the operation of the thermostat during the first time interval; and
   controlling the HVAC system during the future occurrences of the first time interval using the setpoint schedule with one or more adjusted setpoints.

2. The thermostat of claim 1, wherein the processing system is further programmed or configured to control the HVAC system by performing further operations comprising:
   identifying a first setpoint in the plurality of setpoints of the stored setpoint schedule that occurs within a threshold time before a beginning of the first time interval; and
   moving the first setpoint to the beginning of the first time interval in the stored setpoint schedule.

3. The thermostat of claim 1, wherein the processing system is further programmed or configured to control the HVAC system by performing further operations comprising:
   identifying a first setpoint in the plurality of setpoints of the stored setpoint schedule that occurs within a threshold time before an end of the first time interval; and
   moving the first setpoint to the end of the first time interval in the stored setpoint schedule.

4. The thermostat of claim 1, wherein the processing system is further programmed or configured to control the HVAC system by performing further operations comprising:
   identifying a first setpoint in the plurality of setpoints of the stored setpoint schedule that occurs within a threshold time after a beginning of the first time interval; and
   removing the first setpoint from the stored setpoint schedule.

5. The thermostat of claim 1, wherein the processing system is further programmed or configured to control the HVAC system by performing further operations comprising:
   identifying a first setpoint in the plurality of setpoints of the stored setpoint schedule that occurs within a threshold time after an end of the first time interval; and
   removing the first setpoint from the stored setpoint schedule.

6. The thermostat of claim 1, wherein the processing system is further programmed or configured to control the HVAC system by performing further operations comprising:
   inserting a first setpoint at a beginning of the first time interval into the plurality of setpoints of the stored setpoint schedule.

7. The thermostat of claim 1, wherein the processing system is further programmed or configured to control the HVAC system by performing further operations comprising:
   inserting a first setpoint at an end of the first time interval into the plurality of setpoints of the stored setpoint schedule.

8. The thermostat of claim 1, wherein the first time interval is regularly repeated on a daily basis.

9. The thermostat of claim 8, wherein the processing system is further programmed or configured to control the HVAC system by performing further operations comprising:
   generating a version of the stored setpoint schedule that removes any changes that were automatically made in response to receiving the indication of the first time interval during a previous day; and
   generating a schedule without interval adjustments by executing an algorithm that learns user behavior by analyzing setpoint adjustments to the stored setpoint schedule made by a user, wherein the algorithm is executed using the version of the stored setpoint schedule that removes any changes that were automatically made in response to receiving the indication of the first time interval during the previous day.

10. The thermostat of claim 9, wherein the processing system is further programmed or configured to control the HVAC system by performing further operations comprising:
generating a schedule with interval adjustments by appending any adjustments to the stored setpoint temperature schedule made by a user during the previous day to the stored setpoint schedule; and
combining the schedule without interval adjustments to the schedule with interval adjustments to generate a learned setpoint schedule with interval adjustments.

11. The thermostat of claim 10, wherein the processing system is further programmed or configured to control the HVAC system by performing further operations comprising:
replacing the stored setpoint schedule with learned setpoint schedule with interval adjustments for a next day following the previous day.

12. A method of operating a thermostat, the method comprising:
storing a stored setpoint schedule in one or more memory devices, wherein the stored setpoint schedule comprises a plurality of setpoints;
receiving temperature sensor measurements from one or more temperature sensors;
controlling an air conditioning (HVAC) system based at least in part on the stored setpoint schedule and the temperature sensor measurements;
receiving an indication of a first time interval, wherein energy is available to the HVAC system at a first rate during the first time interval, energy is available to the HVAC system at a second rate during a second time interval that is outside of the first time interval, and the first rate is higher than the second rate;
identifying or adding one or more setpoints in the plurality of setpoints of the stored setpoint schedule that occur in, or within a threshold time of, the first time interval;
adjusting or setting the one or more setpoints to reduce energy usage during the first time interval;
receiving user changes to the operation of the thermostat during the first time interval;
executing a learning algorithm to update the stored setpoint schedule to be used in future occurrences of the first time interval by combining:
(i) the one or more setpoints that were adjusted to reduce energy usage during the first time interval; and
(ii) the user changes to the operation of the thermostat during the first time interval; and
controlling the HVAC system during the future occurrences of the first time interval using the setpoint schedule with one or more adjusted setpoints.

13. The method of claim 12, wherein the indication of the first time interval is received from a thermostat management server.

14. The method of claim 13, wherein the first time interval is defined by:
a start time;
an end time;
an average price per kilowatt hour; and
a cost multiplier during the first time interval.

15. The method of claim 13, wherein:
the first time interval is received as part of a plurality of time intervals; and
the plurality of time intervals is continuous.

16. The method of claim 15, wherein the plurality of time intervals is defined by a utility provider, and is transmitted to a thermostat management server via a custom application programming interface (API).

17. The method of claim 16, wherein the utility provider comprises a solar panel provider, wherein the utility provider has installed one or more solar panels at a structure in which the thermostat is installed.

18. The method of claim 17, further comprising receiving, from the thermostat management server, an HVAC capacity, wherein the HVAC capacity is measured by the solar panel provider when the solar panels are installed at the structure.

19. The method of claim 12, further comprising:
identifying a first setpoint in the plurality of setpoints of the stored setpoint schedule that occurs within a threshold time before a beginning of the first time interval;
moving the first setpoint to the beginning of the first time interval in the stored setpoint schedule;
identifying a second setpoint in the plurality of setpoints of the stored setpoint schedule that occurs within a threshold time before an end of the first time interval; and
moving the second setpoint to the end of the first time interval in the stored setpoint schedule.

20. The method of claim 12, further comprising:
identifying a first setpoint in the plurality of setpoints of the stored setpoint schedule that occurs within a threshold time after a beginning of the first time interval;
removing the first setpoint from the stored setpoint schedule;
identifying a first setpoint in the plurality of setpoints of the stored setpoint schedule that occurs within a threshold time after an end of the first time interval; and
removing the first setpoint from the stored setpoint schedule.

* * * * *